United States Patent
Kumar et al.

(10) Patent No.: US 10,031,986 B1
(45) Date of Patent: Jul. 24, 2018

(54) SYSTEM AND METHOD FOR CREATING A SPICE DECK FOR PATH-BASED ANALYSIS OF AN ELECTRONIC CIRCUIT DESIGN USING A STAGE-BASED TECHNIQUE

(71) Applicant: Cadence Design Systems, Inc., San Jose, CA (US)

(72) Inventors: Vishnu Kumar, Uttar Pradesh (IN); Manuj Verma, Uttar Pradesh (IN)

(73) Assignee: Cadence Design Systems, Inc., San Jose, CA (US)

(*) Notice: Subject to any disclaimer, the term of this patent is extended or adjusted under 35 U.S.C. 154(b) by 58 days.

(21) Appl. No.: 15/086,654

(22) Filed: Mar. 31, 2016

(51) Int. Cl.
*G06F 17/50* (2006.01)

(52) U.S. Cl.
CPC ...... *G06F 17/5031* (2013.01); *G06F 17/5036* (2013.01)

(58) Field of Classification Search
CPC .................. G06F 17/5081; G06F 17/5031
USPC ................ 716/108, 113, 136, 134; 703/16
See application file for complete search history.

(56) References Cited

U.S. PATENT DOCUMENTS

| | | | | |
|---|---|---|---|---|
| 5,625,803 A * | 4/1997 | McNelly | ............ | G06F 17/5022 703/14 |
| 6,405,348 B1 * | 6/2002 | Fallah-Tehrani | .... | G06F 17/5031 716/113 |
| 6,564,194 B1 * | 5/2003 | Koza | ............ | G05B 11/42 706/13 |
| 8,302,046 B1 * | 10/2012 | Keller | ............ | G06F 17/5031 716/108 |
| 8,954,307 B1 * | 2/2015 | O'Riordan | ......... | G06F 17/5022 703/14 |
| 9,589,096 B1 * | 3/2017 | Gupta | ............ | G06F 17/5081 |
| 9,710,586 B2 * | 7/2017 | Muller | ............ | G06F 17/5059 |
| 2015/0178432 A1 * | 6/2015 | Muller | ............ | G06F 17/5022 716/30 |

* cited by examiner

*Primary Examiner* — Phallaka Kik
(74) *Attorney, Agent, or Firm* — Mark H. Whittenberger, Esq.; Holland & Knight LLP

(57) ABSTRACT

The present disclosure relates to a system and method for performing Path-Based Analysis (PBA) of an electronic circuit design. Embodiments may include receiving a command to create a spice deck of a timing path associated with the electronic circuit design. In response to receiving the command, embodiments may further include initiating PBA for the timing path and identifying one or more stages within the timing path. Embodiments may also include performing a delay calculation for each of the one or more stages and generating a stage spice deck for each of the one or more stages based upon, at least in part, information from the delay calculation, wherein the stage spice deck encapsulates all elements of the stage. Embodiments may further include connecting the stage spice deck for each of the one or more stages in series to form a complete path spice deck.

18 Claims, 19 Drawing Sheets

| Net | Pin | Cell | Arc | Delay | Slew |
|---|---|---|---|---|---|
| in | in -> | - | in ^ | - | 0.0080000 |
| in | inv1/I | INVD08WP12T35 | - | 0.0000000 | 0.0080000 |
| net_1 | inv1/ZN | INVD08WP12T35 | ! ^ -> ZN v | 0.0308000 | 0.0485000 |
| net_1 | inv2/I | INVD48WP12T35 | - | 0.0001000 | 0.0485000 |
| net_2 | inv2/ZN | INVD48WP12T35 | ! v -> ZN ^ | 0.0382000 | 0.0223000 |
| net_2 | inv3/I | INVD48WP12T35 | - | 0.0001000 | 0.0223000 |
| net_3 | inv3/ZN | INVD48WP12T35 | ! ^ -> ZN v | 0.0184000 | 0.0120000 |
| net_3 | inv4/I | INVD48WP12T35 | - | 0.0002000 | 0.0120000 |
| out | inv4/ZN | INVD48WP12T35 | ! v -> ZN ^ | 0.0107000 | 0.0054000 |
| out | out -> | Mload_2_0 | - | 0.0000000 | 0.0054000 |

Stage1, Stage2, Stage3, Stage4, Stage5

FIG. 6

SCHEMATIC OF PATH NETLIST

SYSTEM AND METHOD FOR CREATING A SPICE DECK FOR PATH-BASED ANALYSIS OF AN ELECTRONIC CIRCUIT DESIGN USING A STAGE-BASED TECHNIQUE

FIELD OF THE INVENTION

The present disclosure relates to electronic design automation (EDA), and more specifically, to a method for creating a SPICE deck for path based analysis of an electronic design using a stage-based approach.

DISCUSSION OF THE RELATED ART

EDA utilizes software tools that may be used in the design and analysis of numerous electronic systems such as printed circuit boards (PCBs) and integrated circuits (ICs). Some EDA tools utilize static timing analysis (STA) as a method to assess the timing of any given digital circuit using software techniques and certain models that provide relevant characteristics of the digital circuit.

While signoff systems and methods are known, such heretofore known systems and methods are encumbered by numerous deficiencies. Some of these include required repeated transformative iterations between timing signoff and physical implementation, highly divergent timing analysis between timing signoff and physical implementation optimizers—with highly pessimistic timing characteristics and attendant false-positive violations (requiring over-fixing), inordinate turnaround time, and overly burdensome storage, processing, and memory requirements. Such deficiencies have hindered efforts to minimize fabricated circuit product cost, time to market, power requirements, and substrate area while maximizing performance.

SUMMARY OF INVENTION

In one or more embodiments of the present disclosure, a computer-implemented method for performing Path-Based Analysis (PBA) of an electronic circuit design. The method may include receiving a command to create a spice deck of a timing path associated with the electronic circuit design. In response to receiving the command, the method may further include initiating PBA for the timing path and identifying one or more stages within the timing path. The method may also include performing a delay calculation for each of the one or more stages and generating a stage spice deck for each of the one or more stages based upon, at least in part, information from the delay calculation, wherein the stage spice deck encapsulates all elements of the stage. The method may further include connecting the stage spice deck for each of the one or more stages in series to form a complete path spice deck.

One or more of the following features may be included. The method may include determining if the timing path includes a complex cell, segmenting at least a portion of the timing path and measuring a delay associated with at least one segmented portion. In some embodiments, performing the delay calculation may be based upon, at least in part, at least one of standard parasitic exchange format ("Spef"), Verilog, design constraint files, and library information. Encapsulating all elements of the stage may include encapsulating one or more attackers in a single abstraction. Until all the stages of the path have been processed, the method may include iteratively performing the delay calculation and generating the stage spice deck. In some embodiments, connecting may occur after determining that the last stage has been reached. The method may include simulating the complete path spice deck. In some embodiments, the timing path may be a static timing analysis (STA) path.

In one or more embodiments of the present disclosure, a system for performing Path-Based Analysis (PBA) of an electronic circuit design using one or more stages is provided. The system may include a computing device having at least one processor configured to simulate the electronic circuit design. The at least one processor may be configured to receive a command to create a spice deck of a timing path associated with the electronic circuit design. In response to receiving the command, the at least one processor may be further configured to initiate PBA for the timing path and to identify one or more stages within the timing path. The at least one processor may be further configured to perform a delay calculation (DC) for each of the one or more stages. The at least one processor may be configured to generate a stage spice deck for each of the one or more stages based upon, at least in part, information from the delay calculation, wherein the stage spice deck encapsulates all elements of the stage. The at least one processor may be further configured to connect the stage spice deck for each of the one or more stages in series to form a complete path spice deck.

One or more of the following features may be included. In some embodiments the spice deck may be associated with at least one of a clock-network analysis, a clock mesh analysis, and a glitch analysis. In some embodiments, performing the delay calculation may be based upon, at least in part, at least one of standard parasitic exchange format ("Spef"), Verilog, design constraint files, and library information. Encapsulating all elements of the stage may include encapsulating one or more attackers in a single abstraction. If the last stage has not been reached, the at least one processor may be configured to iteratively perform the delay calculation and the generating the stage spice deck. In some embodiments, connecting may occur after determining that the last stage has been reached. The at least one processor may be configured to simulate the complete path spice deck. The timing path may be a static timing analysis (STA) path.

In another embodiment of the present disclosure, a method for performing Path-Based Analysis (PBA) of an electronic circuit design using one or more stages is provided. The method may include receiving a command to create a spice deck of a timing path associated with the electronic circuit design. The method may further include initiating PBA for the timing path and dividing the timing path into one or more static timing analysis ("STA") stages. The method may also include performing a delay calculation (DC) for each of the one or more STA stages and generating a stage spice deck for each of the one or more STA stages based upon, at least in part, information from the delay calculation. The method may also include connecting the stage spice deck for each of the one or more stages in series to form a complete path spice deck.

One or more of the following features may be included. In some embodiments, the method may include receiving STA information from an STA timing report. The STA timing report may include at least one of netlist, pin, cell, arc, delay and slew data. In some embodiments, an element used in a plurality of stages may utilize a duplicative naming convention.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 6 is an example timing report consistent with embodiments of the present disclosure;

DETAILED DESCRIPTION

Figure 1:
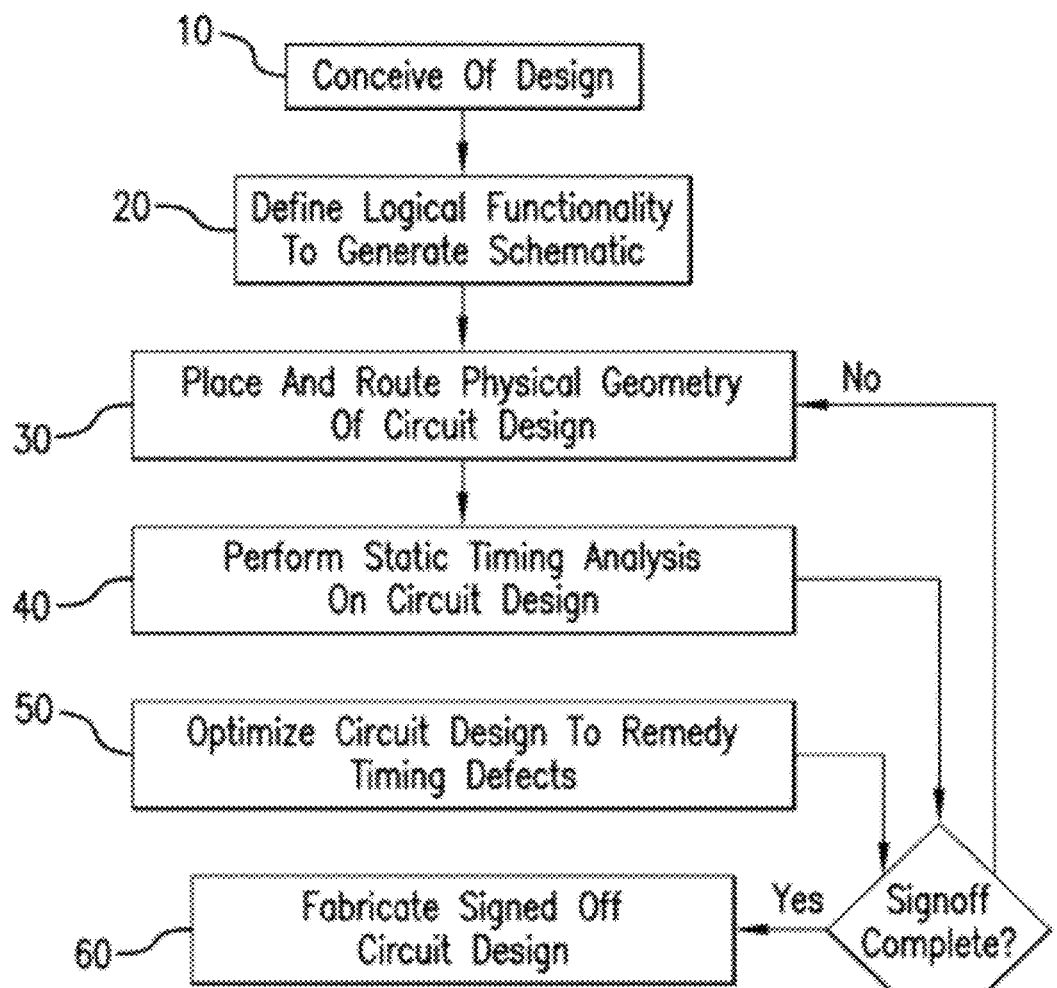
FIG. 1 is a flow diagram illustrating an exemplary electronic design automation (EDA) design flow beginning with a conceived design and culminating in a physical, tangible, operable fabricated device.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As is discussed in further detail hereinbelow, embodiments of the present disclosure provide systems and methods for using stage-based techniques to generate a hierarchical path spice deck for validation of path-based timing analysis (PBA).

An electronic design automation (EDA) flow traverses recursively through a plurality of stages towards the actual fabrication of complex integrated circuit devices, micro chips and systems. Device designs as small as a microcontroller in a smartwatch to devices as large as a very complex system on chip (SOC) including a plurality of cores coupled to an on chip memory and I/O are extensively planned out, verified, and remedially modified/transformed repeatedly to arrive at a fabricated tangible physical device. At first, an engineer or designer has an idea for a new circuit design or device. This idea may then be mapped out into a logical schematic data defining a qualitative view of the functional goals of the device and interconnections amongst components thereof. For example, a terminal Y of an AND logic gate AND1 is coupled to a terminal B of an OR logic gate OR1 and a terminal Y of OR1 proceeds to an output2 to define segments of a path through the design. If the design receives an input X on AND1/A, then an output X should follow at a certain output, for example, OR1/Y.

A physical layout implementation stage builds upon such logical schematic abstraction of the data design to generate data specifying how such logical schematic may actually be implemented physically. A physical layout may be generated by placement and routing steps to include geometries and placement coordinates of components such as gates, buffers, registers, flip-flops, and all manner of electrical integrated circuit structures along with routing interconnections between these components.

Further data abstractions such as a mask pattern which may be the ultimate or final step prior to fabrication of the physical device embodying the circuit design may be included in the circuit design data as well. The totality of all the physical implementation data abstractions plus extrinsic data may collectively define the circuit design.

The placement and routing steps allocate the placement for these individual components on a semiconductor substrate, such as silicon, germanium, or the like, with actual physical geometries and a physical coordinate-mapped organization reflecting how the circuit design will be actually fabricated on the silicon substrate by optical lithography or other such fabrication measures. The routing portion seeks to interconnect each of the individual components (such as an AND, OR, buffers, and the like) to allow a signal to pass therethrough, thereby defining a path consisting of a set of segments between nodes through the circuit design. Once a physical layout has been generated, a number of extensive verification checks and analyses are performed in a signoff stage to ensure that the physical implementation of both the idea and the logical design meet the design goals, rules, and constraints thereupon, and functions as expected.

Signoff may be accomplished by the performance of static timing analyses (STA), amongst other tools, to determine the operational timing characteristics throughout the system design to ensure proper functionality. The static timing analysis (STA) may include a plurality of different static timing analysis methodologies variously performing different algorithmic checks on the circuit design with attendant accuracy vs. run time trade offs for each. Several examples of different STA analyses include a graph-based analysis (GBA) which performs timing analysis on a node by node level traversing exhaustively throughout the circuit design. A path-based analysis (PBA) may perform a different set of algorithmic checks on the circuit design which are more realistic, less conservative, and pessimistic than the GBA analysis. In such regard, the PBA analyzer may require a much greater run time, a much greater memory footprint, storage footprint, and extensive processing resources—however, PBA provides a much more accurate, realistic, or less pessimistic set of operational timing characteristics of the circuit design than the GBA analysis. The GBA analysis is generally performed in a faster manner with reduced run time, reduced accuracy and realism, through a conservative or pessimistic approach including several different worst-case assumptions, and a plurality of other measures designed to allow GBA to perform more quickly, though with a reduced accuracy and increased conservatism thereof. Such analysis generally operate, for example, by providing any input A and determining whether an output B arrives at a certain time on an output of the design irrespective of the particular input provided thereto. Such a signoff stage may be extremely slow and time-consuming utilizing a large amount of data, processing resources, temporary storage resources, and large amounts of permanent storage resources for the resultant timing data bases thereof. The signoff, utilizing tools such as the static timing analysis and other such verification tools, must be as close to 100% accurate and thorough as possible as they are the last practical chance to catch any possible timing violations under any possible operational and environmental conditions before vast resources are committed to physical fabrication of often very substantial quantities of the implemented design. Changes to a circuit design after fabrication has commenced may reach astronomically prohibitive costs and complexity and may indeed be impossible without substantial waste and retooling.

Electronic chips, integrated circuits, and systems of all varieties are approaching sizes and complexities never before seen and will continue to exponentially increase unabatedly into the foreseeable future. Gigascale designs already incorporate oftentimes hundreds of millions of instances which each may have several tens of gates. For example, 150 million logical gates may be arranged into one unified coherent system design. The design data characterizing the physical properties and operational characteristics such as timing of these gates and their interconnections may become massive—easily outstripping the capacity of available storage, memory, and processing systems. Hundreds of gigabytes, and even tera or petabytes of data may oftentimes be required for a single design. Therefore, tools facilitating an EDA flow, such as, for example, a placement and routing physical implementation tool or signoff timing analysis tool may not be performed in total all at once by one processor, stored on only one hard drive, or contained in a single machine's memory, but may, instead, need to be broken up into a plurality of partitions to operate in massively parallel processing and storage system configurations to accomplish transformations and analyses thereupon within a reasonably acceptable runtime. Such runtime may, merely illustratively, be an overnight process, or an over-weekend process, however, the lengths of the analyses and remedial corrections thereupon may stretch to several days, several weeks, months or even greater periods of time.

Generally, after a placement and routing design implementation stage has completed, a signoff engine takes the entirety of the design for such exhaustive verification thereof, as discussed above. The signoff engines (and the placement and routing engines to a lesser extent as well) must determine whether the design will work in any and all operating conditions.

Executing one, let alone a plurality of different static timing analyses, is an incredibly processor, time, power, and storage intensive task. Each time a change is made to the design, a battery of tests must be re-run which may oftentimes take several days to perform. Aggregating such delays results in tremendous wasted time, money, and manpower to such an extent that some changes and fixes may be too prohibitively expensive in such terms to actually implement. Any time, for example, the signoff test finds a violation, a repetitive loop of engineering change orders (ECOs) directed to the physical implementation engine must be entered. This ECO loop iterates repetitively through a physical implementation of placement and routing to correct errors or timing violations located and detected in the signoff process. It is only when signoff completes 100% accurately that reporting zero timing violations that the chip may then proceed to production. Even a single minor violation or flaw in the system design such as the minor, but notorious, PENTIUM® bug of the 1990's resulted in approximately half a billion dollars $450 Million of recall and replacement expenses and untold loss of goodwill for INTEL® System designs and marketplace stakes have only increased in the succeeding decades.

Unfortunately, in the physical optimization portion, fixing one violation may actually result in creating more violations. Due to substantial differences between the physical implementation placement and routing engine and the signoff static timing analyses engines, the physical implementation portion often over-fixes or under-fixes detected violations, resulting in substantial re-analyses/fixing loops. The engines perform very different estimations/calculations on the results of the fixes which only exacerbates such loops and leads to the widely divergent design-view, leading to over/under fixing and in turn resulting in numerous ECO loops and great delay.

The aforementioned fixing may involve resizing a gate to increase a delay to obviate a setup violation, resizing a gate smaller to reduce delay to address a hold type violation, inserting an additional gate to create additional delay, removing unnecessary buffers or gates to reduce delay, and the like.

Only further complicating such processes—owing to the large amounts of data and processing time required at a physical implementation engine, the physical implementation placement and routing (P & R) may only exercise one clock of the circuit design, whereas the signoff STA type engines generally must exercise all paths throughout the design including, potentially, a plurality of clocks whereas the physical optimization engine only exercises the one clock. The plurality of clocks may exist due to a separate clock for a main processor, a memory, or an input/output (I/O) bus. The signoff engine cannot be allowed to miss violations and must therefore be much more accurate and intensive, exercising the entirety of the design, whereas a physical implementation engine may only test a portion of the design due to time, storage, and processing constraints. Moreover, the signoff STA may become aware of parasitics or intercoupling between elements that may not be determined at all in the physical implementation engine. To address some of the incredible resource requirements of the signoff STA, an abbreviated analysis may be performed with highly pessimistic results, for example, the graph based analysis (GBA) may not analyze each of a plurality of fan-in path timings to a multiple input device, but may instead consider only the worst case and treat that as a propagated value throughout the design for all paths, meaning that if the worst-case meets the timing constraints or requirements, then potentially it can be assumed that any of the inputs with lesser magnitude timing issues will all meet the constraints.

When the physical implementation engine seeks to fix a violation, it generally has a number of strategies to correct such violation, such as, for example, inserting a buffer into the design, such that the signal inputted at a portion A arrives at a portion B on time without a timing violation therein. Alternatively, to introduce a greater or lesser amount of delay in the signal, a particular logic gate or buffer may be resized. Such resizing or insertion of a buffer may change the delay therethrough and may introduce additional rule, constraint, or timing violations. Moreover, the buffer may be inserted in an illegal location conflicting with other components of the design which may only be determined later in the signoff stage, thus resulting in more iterative loops back to implementation to legally place the buffer or move other conflicting components which may again result in further ECO loops. It is seen that such physical implementation and signoff differences and complexities experienced in fixing one problem may result in, for example, 99 new problems. Such repetitive looping among tools along the EDA flow is a substantial impediment to timely fabrication of physical devices for market consumption and constraining costs to recoup on extensive research and development.

Several strategies may be employed to combat the excessive delay and expense typically encountered in electronic circuit design in terms of processing, storage, manpower, and the like. First, signoff static timing analyses (STA), such as GBA, PBA, and the like, and physical implementation optimization, may be distributed amongst a plurality of processors which may result in a plurality of host processing systems. For example, if there are 1,000 different modes needing to be analyzed of a circuit design, a first CPU may be responsible for determining a first 500 modes and a second CPU may be responsible for signing off a second 500 modes. It should be noted that this is an extremely simplified example and that any number from 1 to n processors, cores, and systems may be utilized such as in a server farm or massively parallel internal or external cloud-type processing system.

Once the distributed timing and signal integrity analyses are performed, such as, for example, in a static timing analysis engine, such as GBA or PBA, distributed across a plurality of CPUs, then a certain amount of timing data output will be generated by each CPU. Such CPUs generate a massive amount of setup/hold timing graph data and various other operational timing characteristic data of the circuit design under analysis.

To further aid the timing signoff and optimization and reduce the number of iterations of the ECO optimization/signoff loop, corrective remedial transformative actions such as buffer insertions or gate resizing of the circuit design may be performed based on enhanced accuracy and reduced pessimism signoff STA timing databases based on hybrid values from a plurality of selectively executed STA analyses. Whereas, in the past, a purely GBA based timing data base of operational timing characteristics of the circuit design with great pessimism added due to the worst casing therein, a simplified waveform for determining slew, a simplified derating value rather than considering actual path length, and a number of other factors, may have led to a wildly inaccurate GBA timing database for pass on to the optimizer physical implementation placement and routing P&R engine. Such physical optimizer placement and routing is needed to correct each of the timing violations encountered therein such as by the insertion, deletion, or modification of the gate and such fixing may have not been necessary. By enhancing the accuracy of the various STA analyses and the resultant data bases thereof provided as input to the physical optimizer, a large number of unnecessary fixes and resultant repetitive loops may be avoided. By providing enhanced signoff analysis, a physical placement and routing optimizer may obviate a large number of transformative remedial fixes upon the circuit design thereof. An enhanced accuracy signoff STA verification may thereby avoid over-fixing or under-fixing detected timing violations inasmuch as generally detected timing violations may not actually violate, but may be a result of overly cautious miscalculation based on the inaccurate GBA. By removing such pessimistic inaccuracies in the signoff STA and the unnecessary over-fixing and under-fixing of the physical implementation placement and routing optimizer, the repetitive ECO loop is thereby obviated and the attendant expenses thereof are mitigated.

For an integrated circuit product to function and operate properly in use, certain electrical impulses or signals must travel from inputs to outputs and in intermediate stages arriving at certain prescribed times. An exemplary signal might leave a first register at a certain clock pulse and should arrive at another register within another clock pulse. To ensure that the finished fabricated integrated circuit product, such as a SOC, meets these timing requirements and operates as required, a plurality of functional or operational timing verifications are performed on the chip—not only to verify, but also to identify and locate problematic areas which may be violations which could lead to a loss of functionality in the finished product. Moreover, while a certain product such as, for example, an ARM processor, may operate at a first timing regime, such as, for example, 100 MHz or 1 GHz, removing timing violations to allow for faster operation of the chip, such as, for example, at 200 MHz or 2 GHz, allows for a more versatile processor which may be used in a plurality of different designs, rather than redesigning a separate chip for each product. Still further, the faster the processor may operate, such as, for example, at 2 GHz, the more operations it is able to perform and the faster the functioning of the operational software run thereon will be. Therefore, timing violations in the circuit design are taken very seriously and any timing violations found therein will need to be remediated, fixed, or corrected. Upon signoff, before the chip is actually physically fabricated, a battery of tests are run on the processor, and a timing model or timing database is generated. The timing database identifies the arrival times at certain locations throughout the circuit of signals therein. If a signal does not reach a certain point by a certain predetermined time, then a timing violation may be found. As discussed above, a certain timing violation may exist at a certain speed or frequency of the chip whereas it may not exist at another lesser or lower frequency or operating speed of the product. The signoff tool analyzes the arrival times in a very pessimistic, conservative, or worst case analysis to ensure that these timing violations do not occur in the finished product. The timing database containing the enumerated times and the violations thereof is generally passed on to the circuit optimizer, physical optimizer, or placement and routing engine to remedy timing violations determined in the product, such as by the insertion of additional logic, such as, for example, buffers, or other gates that help to either increase or reduce delay in either data, clock, or other types of paths throughout the circuit. When a timing database with overly pessimistic, conservative, or worst case values is passed to the fixer, the fixer may seek remedy something that isn't actually broken and thereby introduce unneeded components.

For example, if the fixer is given a timing database indicating a timing violation in the certain path, the fixer may seek to insert additional gates to increase delay to thereby solve a problem. However, it may be that the timing values and violations found therein are overly pessimistic or overly optimistic and therefore depart from a realistic assessment of timing propagation throughout the circuit design. When a timing violation is detected, the fixer is given the circuit design to fix and this loop iterates multiples times with the fixer correcting a detected violation and sending the design back to the signoff to verify that it has been fixed and failing the fix, the design iterates back through the optimizer fixer to remediate the problem. This insertion of buffers or additional gates increases the size of the circuit, increases the power drain on the circuit and the cost of the circuit as silicon substrate is very expensive. Therefore, by minimizing circuit design for a circuit product that will be fabricated many millions of times, each incremental savings in space, power, and cost are, in the aggregate, very beneficial to the industry and consumers.

Ideally, a more accurate, realistic, less pessimistic and conservative timing database is passed to the optimizer/fixer such that no false timing violations exist and the fixer is only fixing actual timing violations as they will happen in the IC product. The fixer or optimizer may be guided to avoid over-fixing, under-fixing, or wasting unnecessary cycles on issues which are only remote possibilities that may not even actually exist. To do this, a more accurate or realistic timing engine or sign-off engine is employed, but the time to run such a more accurate or realistic engine may be overly expensive in terms of cost, time, manpower, and delays of entry into the market. Therefore, running a more accurate or realistic timing engine may be prohibitive and may not indeed be possible. Herein, a graph-based analyzer (GBA), which tends to be fast but not very accurate or realistic, may be executed to analyze the circuit design. Performing this graph based analysis generates a timing database of overly pessimistic or unrealistic timing which, in the conventional flow, are passed on to the optimizer or physical placement and routing engine. Based upon those inaccurate and unrealistic values of the timing violations in the circuit design leads to a repetitive loop of introducing unnecessary gates. Each added gate has a corresponding power drain and a size penalty imposed on the design. Such optimizing/fixing substantially delays production of an IC product embodying the circuit design. The PBA, while non-viable for the entirety of the circuit design due to the prohibitively high cost (in terms of runtime, processing power, and storage) thereof, may be selectively employed upon the identified worst timing violations determined in the GBA analysis.

The path-based analyzer (PBA) generates more realistic and more accurate timing values of the circuit design. The more accurate and more realistic PBA measurements may then be selectively injected into the GBA timing database. The more realistic PBA timing values selectively replace the identified time violating values of the GBA timing database and the newly formed GBA/PBA hybrid timing database is then reconciled firstly to resolve GBA vs. PBA conflict and then to ensure consistency of propagation of values throughout the circuit design. This hybrid GBA/PBA database, once reconciled to be internally consistent, will appear to be a GBA generated database and may be passed on to any known optimizer product. Ideally, this hybrid database has removed all false positive timing violations which may have been identified incorrectly under the overly pessimistic GBA approach.

By removing these false positive violations, unnecessary fixes by the physical placement and routing optimizer are thereby avoided with the attendant benefits of removing unnecessary fixing, the run time requirement thereof, the cost thereof, the costs of insertion of additional gates and additional logic and the resizing of additional logic, to thereby result in a more efficient and more expeditiously generated and verified circuit design for physical fabrication thereof into an operable, tangible, and functional integrated circuit product, such as, for example, a system on chip (SOC) processor.

As seen in the illustrative flow diagram of FIG. 1, a design idea is conceived of at block 10. One or a team of circuit designers then seek to refine the conceived design idea to define logical functionality and generate a logical schematic of the circuit design at block 20. The largely qualitative logical schematic design generated at block 20 is then further refined or elaborated upon to define specific physical geometry and coordinates of each individual gate or element of the design with interconnects defined therebetween at block 30. Block 30 results in the generation of a physical layout of the circuit design. At block 40, the circuit design is signed off by performing a battery of a plurality of different static timing analyses on the circuit design to ensure proper functionality thereof. Such battery of static timing analysis (STAs) may include, for example, a graph-based static timing analysis where the individual nodes in a circuit design are analyzed. The exemplary GBA analysis may involve a plurality of assumptions which reduce accuracy in a conservative manner to indicate false positive violations where actual violations or their magnitudes may not exist or may not be as severe as determined by the less accurate GBA.

Another type of static timing analysis may include path-based analysis (PBA) which analyzes specified paths throughout the circuit design at block 40. Such a PBA may have reduced pessimism by incorporating a number of features that may have been too expensive in terms of processing, storage, runtime, and the like for the graph based analysis. In such manner, the PBA may have a higher accuracy of operational timing characteristics determined, at the expense of a greater runtime and greater expenses in terms of processing, temporary storage, and ultimate data base storage of timing results.

After performing the static timing analyses on the circuit design, a set of nodes and their resultant operational timing characteristics are passed on to the physical circuit optimizer to remedy, in a transformative manner, the timing defects such as discussed above by insertion, deletion, or modification of gates in the circuit design at block 50. Upon conclusion of the execution of block 50 and the optimization or remedial transformation of the circuit design, a final sign off, such as a static timing analysis, at block 40, is performed. Generally blocks 30 to 50 are repetitively iterated many times to converge signoff and physical optimization and arrive at a fully signed off circuit design. Upon completion of signoff and verification, the circuit design is passed at block 60, to be fabricated as fully signed off. At block 60, a number of additional processes may be performed such as optical resolution enhancement, tape out, and the like, whereby the end result is a fully fabricated, physical, tangible, and operable physical product defined by the circuit design thereof.

Figure 1A:
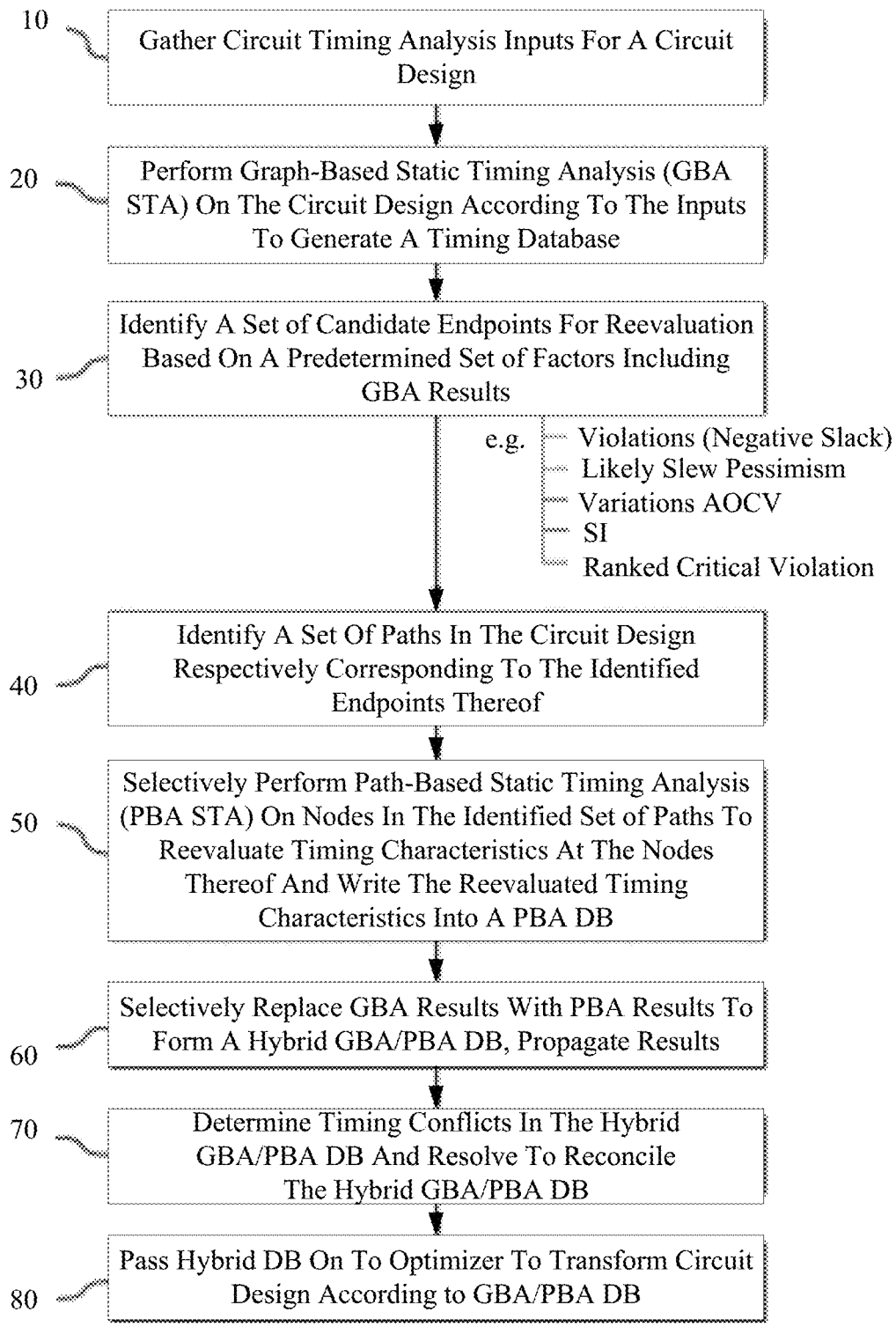
FIG. 1A is a flow diagram illustrating an exemplary enhanced flow for guiding remedial transformations of a circuit design defined by physical implementation data to reduce physical corrections for detected apparent violations in the circuit design.
Figure 1B:
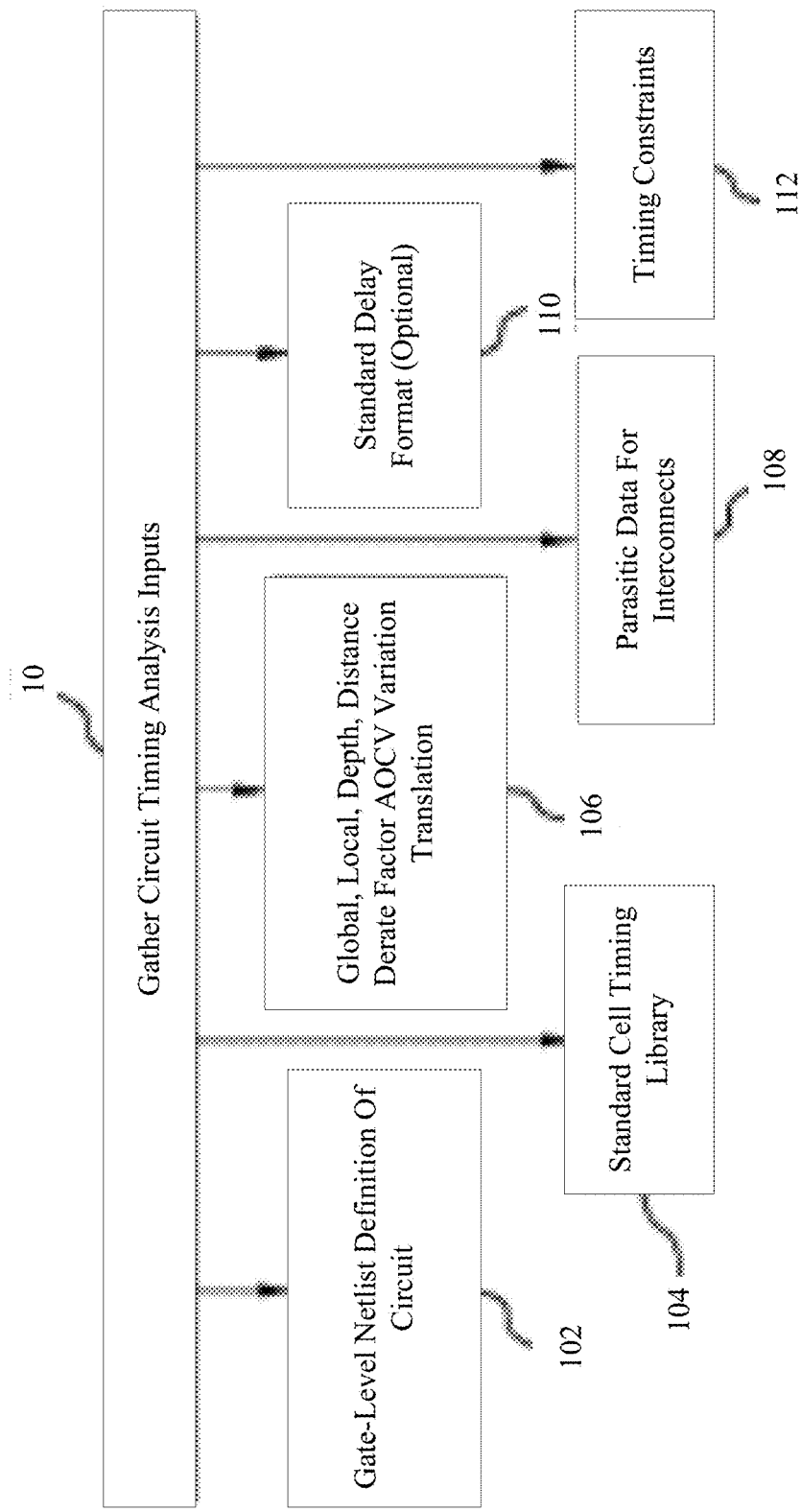
FIG. 1B is an exemplary block diagram illustrating a flow for gathering circuit timing analysis inputs.
Figure 1C:
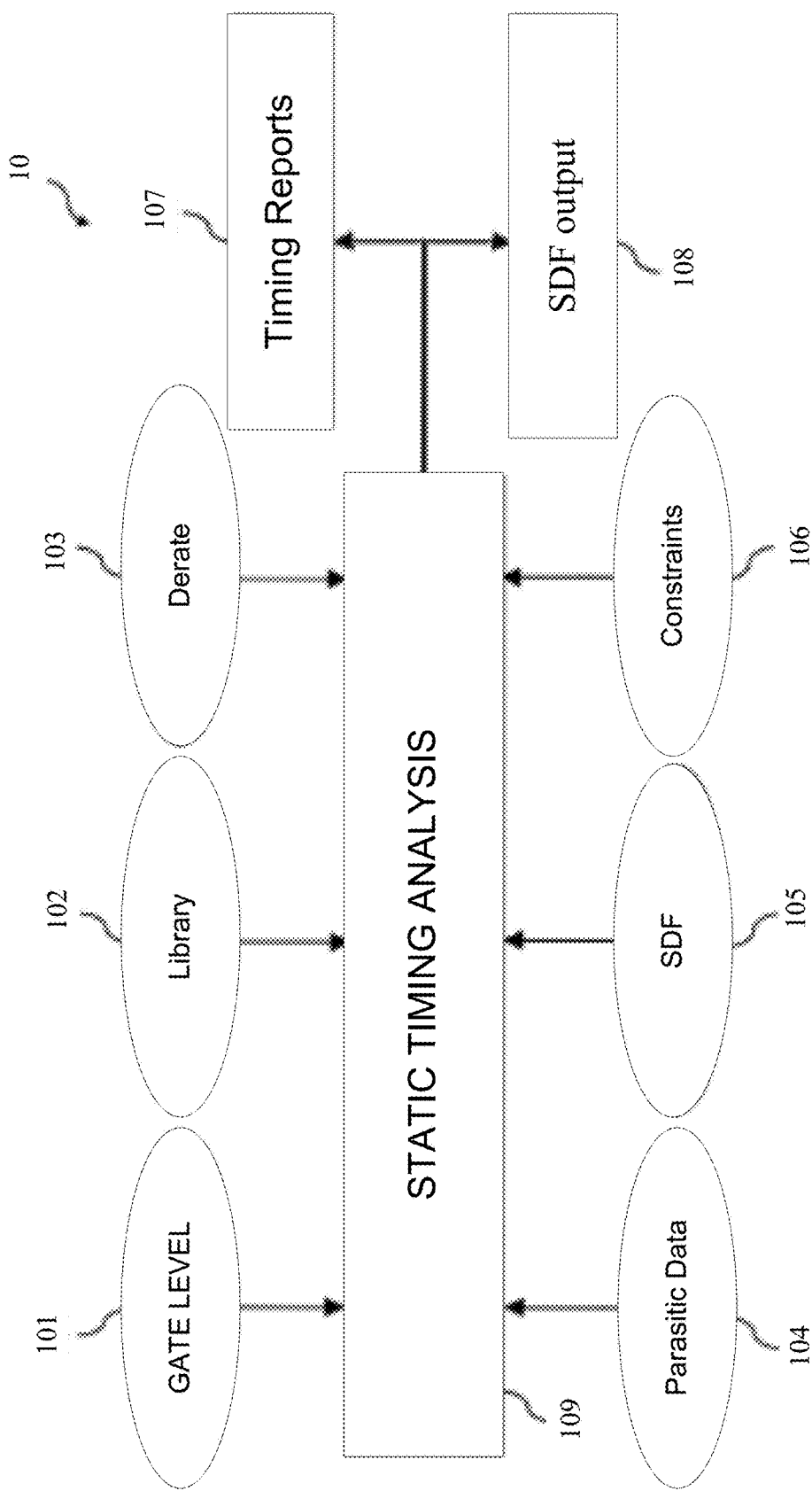
FIG. 1C is an exemplary block diagram illustrating the gathering of multiple inputs for a static timing analysis of the circuit design data.
Figure 1D:
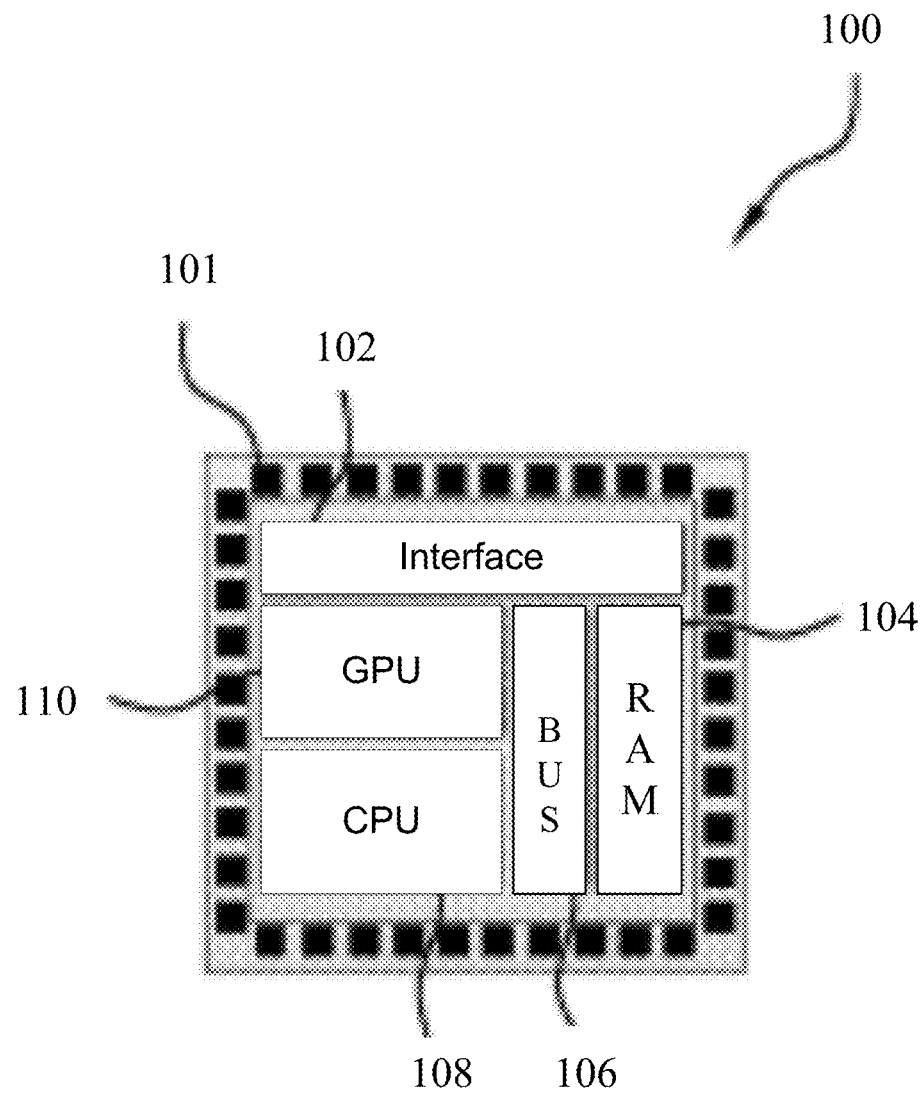
FIG. 1D is a simplified block diagram of an exemplary circuit design representing a processor-based system on chip (SOC) IC product.

As seen in the illustrative block diagram of FIG. 1D, a simplified exemplary circuit design 100 of a system on chip (SOC) includes a plurality of interface pins 101, interchangeably referred to herein as pins, terminals, nodes, ports, and the like. Additionally, a central processing unit (CPU) 108 is coupled via a bus 106 to a memory module 104, shown as a random access memory (RAM). The CPU 108 is additionally coupled to a graphics processing unit (GPU) 110 and the circuit design 100 also includes an interface 102 meant for interfacing with external peripherals and hosts. The exemplary circuit design 100 is merely a highly simplified graphical representation of an exemplary system on chip design. The actual circuit design may comprise potentially tens to hundreds of millions of instances where each instance may be defined by a plurality of logical gates or components, such as AND, OR, NOR, XOR, gates and the like, arranged upon a semiconductor substrate to implement a plurality of logical functions such as, for example, an adder, arithmetic logic unit (ALU), floating point unit (FPU), and the like. While FIG. 1D shows a highly simplified graphical representation of the circuit design, such circuit design may include a plurality of different data abstractions such as a logical representation (also referred to as a schematic), which maintains a qualitative component list and interconnections between these components and some degree of connectivity information. Additionally, a physical implementation abstraction (also referred to as a layout) includes a fully fleshed-out, elaborated, placed and routed representation of the circuit design. The physical layout generally includes an actual coordinate-mapping of absolute physical locations of all of the components of the circuit design onto a semiconductor substrate and specific geometric dimensions thereof compared with merely relative locations in a logical schematic. Additionally, interconnective routing and the exact paths for electrical impulses and signals to follow between components throughout the circuit design are also fully detailed within the physical layout.

To recap, as seen in FIG. 1, an exemplary electronic design automation (EDA) flow is shown. A circuit design starts with a design idea at block 10 which may be a seed of a design conceived by a team of circuit designers to address a need or necessity. Such logical schematic of the circuit design more fully elaborates a designer's idea and seeks to capture the abstracted logic and qualitative properties required to implement the idea. Once a logical schematic has been completed, flow proceeds to block 30 where routing, component placement and timing, parasitic optimization is performed to arrive at an optimum (or at least workable) arrangement amongst a silicon substrate housing the plurality of components to meet a plurality of design rules, constraints, and goals while at the same time faithfully reproducing the logical functionality of the logical schematic created at block 20. Between blocks 40 and 50, a repetitive iterative loop of performing static timing analysis signoff on the circuit design at block 40 and optimizing the circuit design at block 50 in a transformative manner to remedy timing defects is exhaustively performed. Once the repetitive loop between signoff and optimization has completed, the circuit design, such as, for example, seen in FIG. 1D is then fabricated into a physical, tangible, and operable product defined by the circuit design data.

The signoff static timing analysis is performed whereby exhaustive timing tests are performed on the circuit design to ensure that everything is correct and will work as desired. This stage is somewhat like a checksum stage where an input is provided to the circuit design and an output is expected at a certain time. However, this timing analysis is run exhaustively and in atomic detail on each and every gate, component, and/or path throughout the entirety of the circuit design. Generally, the timing analysis and the timing signoff is performed not only once for the design, but a plurality of times, once for each representative view of the circuit design where a view is a unique permutation of corners and modes of operational corners and modes. Therefore, the timing signoff is generally a very time, processing, and memory intensive process.

As seen in FIG. 1A, a battery of disparate static timing analyses are performed on the circuit design to arrive at a hybrid operational timing characteristic database of the circuit design incorporating the plurality of heterogeneous timing analyses performed thereon. As seen at block 10, a plurality of circuit timing analysis inputs is gathered for the circuit design. As an example, a gate level netlist definition of the circuit design may be loaded whereby each pin or node of the design is accounted for and a topological depiction of the relation amongst other pins, nodes, or gates is presented. Additionally, timing constraints may be input into the static timing analyses. At block 20, a graph-based static timing analysis (GBA STA) on the circuit design is performed according to the inputs to generate a GBA timing database for the circuit design. The graph-based analysis has a number of defects or shortfalls that make accurate timing analysis of the circuit design very difficult. For example, to manage the length of time or runtime of the analyses, the graph-based analysis is performed in an abbreviated manner whereby each exhaustive path between components may not be evaluated and characteristics thereof retained, but merely a worst-case amongst inputs may be evaluated for a multi-input component. Additionally, a number of other factors contribute to making the GBA analysis one which is executable in a manageable portion of time with results which may not be accurate, but are biased towards finding a violation— even where one may not actually exist.

The GBA analysis propagates throughout the circuit design and creates a timing database of actual signal arrival times subtracted from required times (defined by constraints at each circuit node), whereby it is determined that the constraint based required time for a signal to arrive and depart a gate, pin, or node, minus the actual arrival time, results in a timing violation if the result is negative, meaning that the signal arrives later than when it is needed. Such a timing violation is referred to as a negative slack. A number of constraints may be placed on a circuit design, such as, for example, requiring a certain signal to arrive at a certain time. Therefore, a required time of arrival herein may be considered a constraint, and an actual arrival time of a signal may be evaluated against the constraint or required time to determine whether the constraint is met. If a signal arrives at a certain time less than the required time, then a timing slack may exist meaning that the signal arrived with an additional slack or tolerance and still meet the constrained time. Therefore, a slack may be defined as the required time minus the arrival time. A negative slack however indicates that a signal did not arrive within the required time, but instead arrived at a time after the required time and therefore the constraint was not satisfied. In such regard, the failure to meet a constraint, such as, by a negative slack, may indicate a timing violation or defect in the circuit design.

As seen in block 50 of FIG. 1, the circuit is optimized to remedy detected timing defects (such as described above), by, for example, the addition of gates, subtraction of gates, or resizing of gates, amongst other remedial actions. As seen in block 20 of FIG. 1A, the graph-based static timing analysis (GBA STA) is exhaustively performed on the circuit design according to the inputs to generate a GBA timing database thereof. The timing database keeps track of each node such as AND gate 1 pin A, AND gate 1 pin B, AND gate 1 pin Y, and the like, and a respectively corresponding required time and arrival time, or merely a slack or negative slack time, where a negative slack generally indicates a timing violation. A positive slack value or arrival within a required time indicates a certain amount of slack, tolerance, or leeway when changing or transforming the circuit design to accommodate timing violations. Accordingly, positive slack nodes may be adjusted to lighten the load on the timing violating pins.

Upon completion of the static timing analysis, preferably a GBA analysis, the timing database may be evaluated to identify at block 30 a set of candidate endpoints for re-evaluation based on a predetermined set of factors, including the GBA operational timing characteristics of those endpoints. The predetermined set of factors may also optionally include violations or negative slacks, likely slew or arrival pessimism, AOCV variations, Signal Integrity (SI) characteristics, magnitude ranked critical violations, various additional likely sources of pessimism, and thresholding. For example, if a signal was to arrive at AND1/A (AND gate 1 pin A) at a specified time such as, for example, 0.58 nanoseconds and the signal actually arrived at that pin at 0.2 nanoseconds, then a resultant 0.38 positive slack time may be recorded in the timing database. Conversely, if a signal was to arrive at the AND gate pin Y at 0.1 nanoseconds, and the signal arrived at 0.5 nanoseconds, the slack would be a −0.4 nanoseconds, thereby indicating a timing violation with the signal arriving at the AND1 gate pin Y (required time minus actual arrival time=slack time). Once every node of the circuit design has been evaluated based on its operational timing characteristics and a GBA timing database containing each of those nodes and their respective operational timing characteristics has been generated, the database may be sorted according to the magnitude of the slack.

If a circuit design or a path through a circuit design is thought of as a chain and the greatest magnitude or most critical of the timing violations in the path, or circuit design, is considered as the weakest link in the chain, then it can be seen that fixing or remediating the most severe of the timing violations or weakest links in the chain will provide the greatest benefit for the overall circuit design. The ranked timing database for each node or endpoint is evaluated to determine the top N set of violating or critical nodes. The N or quantity of such top N may be based upon a determination of an acceptable runtime. For example, if a design shop has a week to run the circuit timing analysis, then perhaps all timing violations may be addressed in the circuit design. However, if suitable runtime is not available, then perhaps a certain threshold of the most severe or most critical timing violations may be addressed while the remainder are not. The remainder would still have to be passed on to the optimizer for remedial transformations thereupon which is less than ideal. Once the targeted candidate endpoints have been determined, a set of paths at block 40 are identified in the circuit design respectively corresponding to the identified endpoints thereof.

The set of paths identified as containing the critical or highest-ranked timing violation containing endpoints is then passed on at block 50 to a path-based static timing analysis (PBA STA) which performs a path based analysis (PBA) only on the enumerated paths from block 40. Whereas the GBA style analysis chose a worst-case path through a multiple input gate, the path-based PBA analysis evaluates all of the timing characteristics of all of the paths separately entering each multi-in gate logic and does not discard actual path characteristics such as by merging the slacks or slews thereof, but instead maintains a comprehensive listing of the different paths even through a single gate. Such PBA analysis thereby removes pessimism introduced by the GBA analysis towards a more realistic timing database to guide the optimizer and reduce corrective loops and unnecessary additional gates.

At block 40, a set of paths corresponding to or containing the set of candidate endpoints or violating nodes are identified. At block 50, a path-based static timing analysis (PBA) is selectively performed on nodes in the identified set of paths at block 40 to thereby re-evaluate timing characteristics at the nodes thereof and write the re-evaluated timing characteristics into a PBA database or datastore with a reduced pessimism relative to the GBA timing database.

At block 60, the GBA timing database is opened and the PBA database or data store is opened, the nodes in each are correlated, and the PBA values are selectively copied from the PBA timing database into the GBA timing database to replace the overly pessimistic or inaccurate GBA timing operational characteristics of each reevaluated gate with a more accurate or more realistic PBA operational timing characteristic thereof. Thereby, with the selective replacement of GBA values with PBA values in the top N selected critical endpoints or paths, a hybrid GBA/PBA database or operational timing characteristics of the gates is established. The hybrid GBA/PBA operational timing database or data store will be passed to the optimization engine which is configured to receiving purely GBA timing databases. At block 70, timing conflicts between GBA and PBA values, such as at multi-input fan-ins of combinational logic are determined. If, for example, a fan-in has a higher magnitude more critical timing violation than a fan-out line of, for example, an AND gate, then an inconsistency in the timing database may be said to exist. Additionally, if an upstream node along a path has a higher magnitude timing violation than a downstream node along a path, then another timing inconsistency may be said to exist in the timing database. Such inconsistencies may be determined by identifying slack for a node in relation to other slacks of other nodes along the path. For example, the consistency checker may start at a first node, record the slack, traverse to an adjacent node and compare its slack with the recorded slack.

At block 80, the reconciled hybrid GBA/PBA database is passed on to the physical implementation optimizer to transform the circuit design according to the timing violations extant in the hybrid GBA/PBA database. The optimizer will selectively insert additional buffers or other such gates or constructs to increase the delay, delete buffers or unneeded logic to reduce delay, or resize gates larger to increase additional delay or smaller to reduce delay across the gates. In such manner, the physical implementation optimizer thereby addresses and accordingly remedies identified actual timing violations in the hybrid GBA/PBA database. Upon completion of optimization at block 80, a final signoff is performed to ensure no timing violations exist and the circuit design is passed off for physical fabrication thereof. With the hybrid PBA/GBA timing database, the final signoff should be performed once all timing violations have been mitigated or removed with a PBA-based signoff such that the additional pessimism inherent in the GBA analysis is not re-introduced. Otherwise, a GBA-based final signoff following timing violation remediation may introduce false positive violations where no violations actually exist, but are due solely to the introduced pessimism in the GBA signoff tool.

Discussing block 10 of FIG. 1A in greater detail, FIG. 1B shows some exemplary inputs which are gathered at block 10 of FIG. 1A. The gate-level netlist definition of the circuit design is gathered at block 102. The gate-level netlist definition defines each gate and a topological structure relating each gate to another gate along a series of predefined paths through the circuit design. For example, it may be seen that input 1 is connected to pin A of AND gate 1. At block 104, a standard cell timing library is imported or gathered for the circuit timing analysis. The standard cell timing library may have a plurality of pre-computed or predetermined delay values across each cell within the circuit design. For example, it may be known that a particular AND gate has a certain delay of 5 nanoseconds across an A and/or B input to the Y output pin thereof. At block 106, a global On Chip Variation (OCV) and/or local (object specific derate factor), depth, and/or distance-based Advanced On Chip Variation (AOCV) timing derate factor translation is imported. In a GBA style analysis, a global timing derate factor, such as, for example, 1.18 is applied promiscuously across all nodes of the circuit design. Such promiscuous application of the global timing derate factor at block 106 may lead to overly pessimistic results and, accordingly, in a PBA style analysis, an actual depth, stage count, timing arc, or phase is counted for the length of each path and a length or depth-based AOCV is applied based upon that length. For example, a path of four timing arcs may have a specific value such as 1.28 global derate, whereas a stage count of 1 may have an AOCV derate factor of 1.01 to be applied to the operational timing characteristics thereof.

At block 108, the parasitic data for interconnections is imported. The parasitic data may include intercoupling effects and other effects such as electromagnetic interference (EMI), parasitic intercoupling, capacitive intercoupling between interconnect wire segments, resistances, and capacitances, and the like to evaluate delay across interconnects. At block 110, a standard delay format (SDF) or SPEF may, optionally, be imported where the delay for certain gates is predefined and at block 112, certain timing constraints defining the required arrival time of a signal at a particular gate are predefined. Arrival times for gates are determined in relation to the timing constraints or required times for each gate to determine a slack value for each node in the circuit design. Other than netlist 102, every other input may vary per analysis view (delay corner+constraint mode). For example, at different Process, Voltage, Temperature corners of the STA analyses, different AOCV, parasitics, delay library values, and/or timing constraints may be employed. A set of input constraints may be applied which define the desired timing that is envisioned from the circuit design.

Various kinds of library models are used to perform static timing analysis. Some standard ones may include liberty format specified .lib library models for defining the delays of standard digital gates (AND, OR, NOT, FLOP, LATCH, and the like), MACROS, AOCV models for performing advanced STA, CDB models for performing Signal Integrity analysis, and the like. Interconnect models (generally in SPEF format, though any suitable format may be employed) are also preferably loaded for STA.

As seen in FIG. 1C, the gate level netlist definition of the circuit is incorporated in section 101 into the static timing analysis 109. The standard cell timing library 102 may also be incorporated into the static timing analysis 109 to build a persistent model of the circuit design such as a timing graph where each component is a node and each interconnect is a path segment between nodes. Additionally, derating factors at block 103 are incorporated into the static timing analysis 109 as well as parasitic data 104, standard delay format data 105, and constraints or requirements at block 106. After the data inputs 101-106 are inputted to the static timing analysis 109 (which may be a GBA or PBA based analysis, or the like), a persistent model of the circuit design is built to include all of the data elements 101-106. The static timing analysis, such as the GBA or PBA analysis, is executed to run on the persistent model of the circuit design which outputs additional standard delay format (SDF) output at block 108 and timing reports 107, such as a GBA timing database to be used in further analysis and violation remediation downstream, such as in the optimizer.

Referring now to FIGS. 2-15, embodiments of the present disclosure depicting the incorporation of Simulation Program with Integrated Circuit Emphasis ("SPICE") capabilities within STA tools are provided. Accordingly, embodiments disclosed herein may be configured to extend an STA path into stages, and drive this concept into SPICE deck creation such that for each STA stage there is a SPICE stage, encapsulated inside a SUBCKT such that it is independent to other stages in the path. All components relevant to the stage may be present in the same subckt/hierarchy, which makes the netlist very easy to understand and debug.

As used herein, the term "SPICE deck" may refer to a SPICE input file, which may include multiple parts. First, Control Statements tell SPICE what type of analysis to perform on the circuit. Then, Data Statements describe the components and the interconnections. Finally, Output Statements may specify what outputs are to be printed or plotted. Although these statements may appear in any order, it is recommended that they be given in the above sequence. In some embodiments, additional statements may be included, for example, the title statement and the end statement. The title statement is the first line and can contain any information, while the end statement is always .END. This statement may be a line by itself, followed by a carriage return. In addition, a user may insert comment statements, which must begin with an asterisk (*) and are ignored by SPICE simulator. An example of the format is provided below:

*TITLE STATEMENT
COMMAND (CONTROL) STATEMENTS
*COMMENT LINE
ELEMENT STATEMENTS
.
OUTPUT STATEMENTS
.END <CR>

In some embodiments, a number of components may be used in SPICE, some of which are described in further detail hereinbelow. For example, a resistor may be described by "Rname", "N1", "N2", and "value", wherein Rname is name of the resistance, N1 and N2 are the nodes of resistance connected between them, and Value is the resistance value in ohms. A capacitor may be described by "Cname", "N1", "N2", and "value", wherein Cname is name of the capacitance, N1 and N2 are the nodes of capacitor connected between them, and value is the resistance value in ohms.

Figure 2:
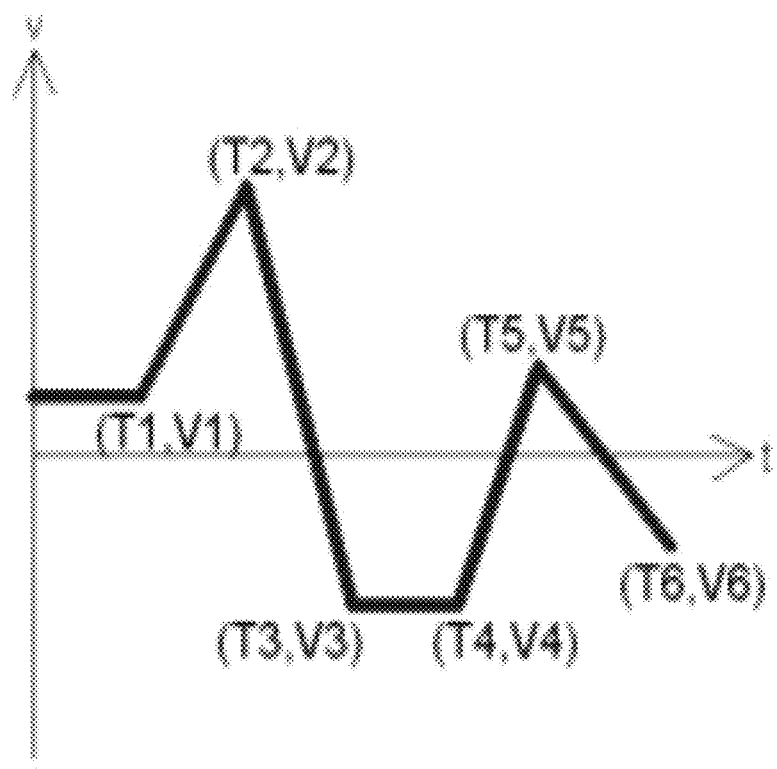
FIG. 2 is an example diagram showing a piece wise linear voltage source consistent with embodiments of the present disclosure.

In some embodiments, one or more types of voltage sources may also be described. For example, a DC voltage source may be described by "VName", "N1", "N2", and "DCValue", wherein N1 and N2 are the node names voltage source connected between them and DCValue is the value of the voltage source in volts. In some embodiments, the name of a voltage and current source may start with V and I, respectively. Additionally and/or alternatively, a piecewise linear voltage source (e.g., Vname N1 N2 PWL(T1 V1 T2 V2 T3 V3 . . . Tn Vn), where (Ti Vi) specifies the value Vi of the source at time Ti. A graphical representation corresponding to a piecewise linear voltage source is shown in FIG. 2.

In some embodiments, SPICE may allow for common elements to be put together and declared as subcircuits. A subcircuit may be defined by a .SUBCKT control statement, followed by the circuit description as follows:

.SUBCKT SUBNAME N1 N2 N3 . . .
Element statements
. . .
. . .
.ENDS SUBNAME

In which "SUBNAME" is the subcircuit name and N1, N2, N3 are nodes of the subcircuit. The nodes being used inside the subcircuit are local.

The following example show how a subckt is created for inverter:

.subckt inv in out
M1 out in gnd <NCH> W=1 L=2
+AS=5 PS=10 AD=5 PD=10
M2 out in vdd <PCH> W=2 L=2
+AS=5 PS=10 AD=5 PD=10
.ends In some embodiments, the element statement for a subcircuit may be similar to any other element. The format is as follows:

Xname N1 N2 N3 . . . SUBNAME

In the above example, "Xname" refers to the element (e.g., subcircuit) being used, N1, N2, N3 are the nodes to which the nodes of the subcircuit are being connected, and "SUBNAME" is the name of the subcircuit being used.

An example of an inverter subckt is being used below. The subcircuit is called Xinv, inst/in and inst/out are nodes connected to subckt terminal N1 and N2.

Xinst inst/in inst/out inv

In some embodiments, SPICE subckts for standard cells are output of cell extraction and are released in library kit so it may not be necessary to write subckts for standard cells.

In addition to the various types of elements that may be used in accordance with the present disclosure, there are different types of analysis available. Some of these may include, but are not limited to, DC, AC, Transient, Monte-Carlo, etc. Transient analysis is relevant to this topic. A .TRAN statement may specify the time interval over which the transient analysis takes place, and the time increments. The format is as follows:

.TRAN TSTEP TSTOP
.TSTEP is the printing increment.
.TSTOP is the final time

Figure 3:
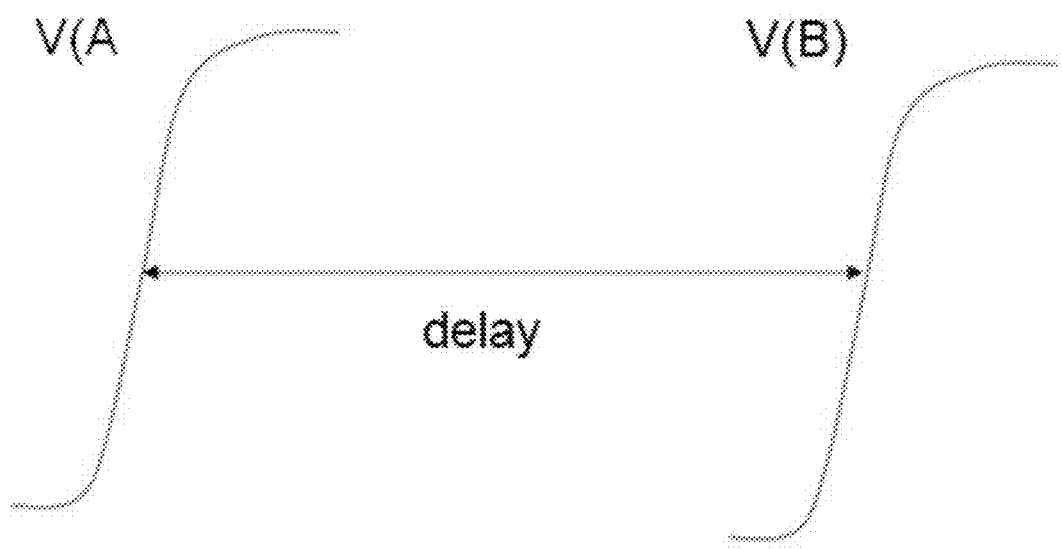
FIG. 3 is an example diagram showing a measurement of delay between node A and node B consistent with embodiments of the present disclosure.
Figure 4:
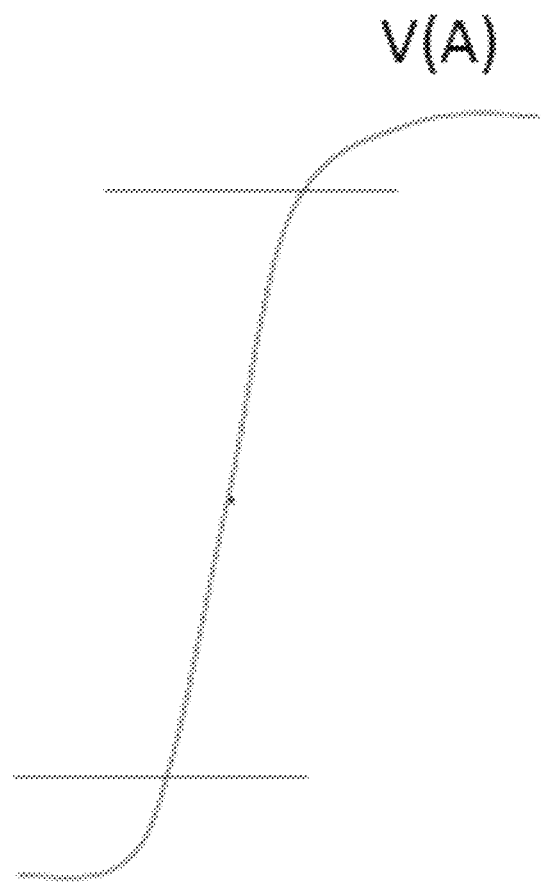
FIG. 4 is an example diagram showing a measurement of slew rate for a transition at Node A consistent with embodiments of the present disclosure.

In some embodiments, an output statement may be used to instruct SPICE what output to generate. There are .PRINT, .PLOT, .MEASURE, etc commands to generate the output. The .MEASURE is discussed in further detail hereinbelow. The .measure statement may be used to measure the delay and slew between two points called trigger (TRIG) and target (TARG). Trigger is the point where measurement starts and it stops at target point. An example showing use of the trigger and target concepts is provided below:

.MEASURE TRAN result
TRIG variable VAL=val CROSS=c RISE=r FALL=f
TARG variable VAL=val CROSS=c RISE=r FALL=f In some embodiments, it is possible to measure delay and slew between two events (e.g., a signal crossing a value is called event). Where, variable VAL=val CROSS=c RISE=r FALL=f and CROSS means RISE or FALL For example, FIG. 3 shows the delay between two signals V(A) and V(B) and FIG. 4 shows a measurement of slew rate for a transition at Node A.

.MEASURE TRAN delay
TRIG V (A) VAL=0.5 RISE=LAST
TARG V (B) VAL=0.5
RISE=LAST
.MEASURE TRAN Slew TRIG V (A) VAL=0.2
RISE=LAST TARG V
(A) VAL=0.8 RISE=LAST As is discussed in detail above, static timing analysis is a method to assess the timing without requiring simulation of any given digital circuit using software techniques and certain models that provide relevant characteristics of the digital circuit. Modern Static timing analysis is performed without requiring a SPICE simulation of any given digital circuit using software techniques and certain models that provide relevant characteristics of the digital circuit. STA that is performed using tabular data from a timing library may have some inaccuracies which may lead to extra optimism/pessimism. Optimism certainly can be disastrous when a chip is used in actual products. Moreover, pessimism up to a certain threshold can be accepted but over pessimism may lead to oversize of the chip.

To verify extra optimism/pessimism a golden reference may be desired so that the STA results may be measured accurately. In this way, a golden reference of STA should be easy to understand to the user and there should be one to one mapping between STA and golden reference at each timing point in the timing path.

Accordingly, in some embodiments SPICE may be used as the golden reference for any STA/Delay calculation tool. As such, a SPICE deck may be created to mimic the Path based STA performed by the tool. To resemble the path based STA, a SPICE deck may be created by connecting nets and cells each other to make full circuit in SPICE.

Some existing STA tools support SPICE deck creation for a timing-path. However, the SPICE netlist they write represents the cells/devices which form the path, any related components like receivers, attackers and their drivers, are all presented as a single monolithic flat netlist. The netlist is standard SPICE syntax and can be simulated in any commercial simulator.

Figure 5:
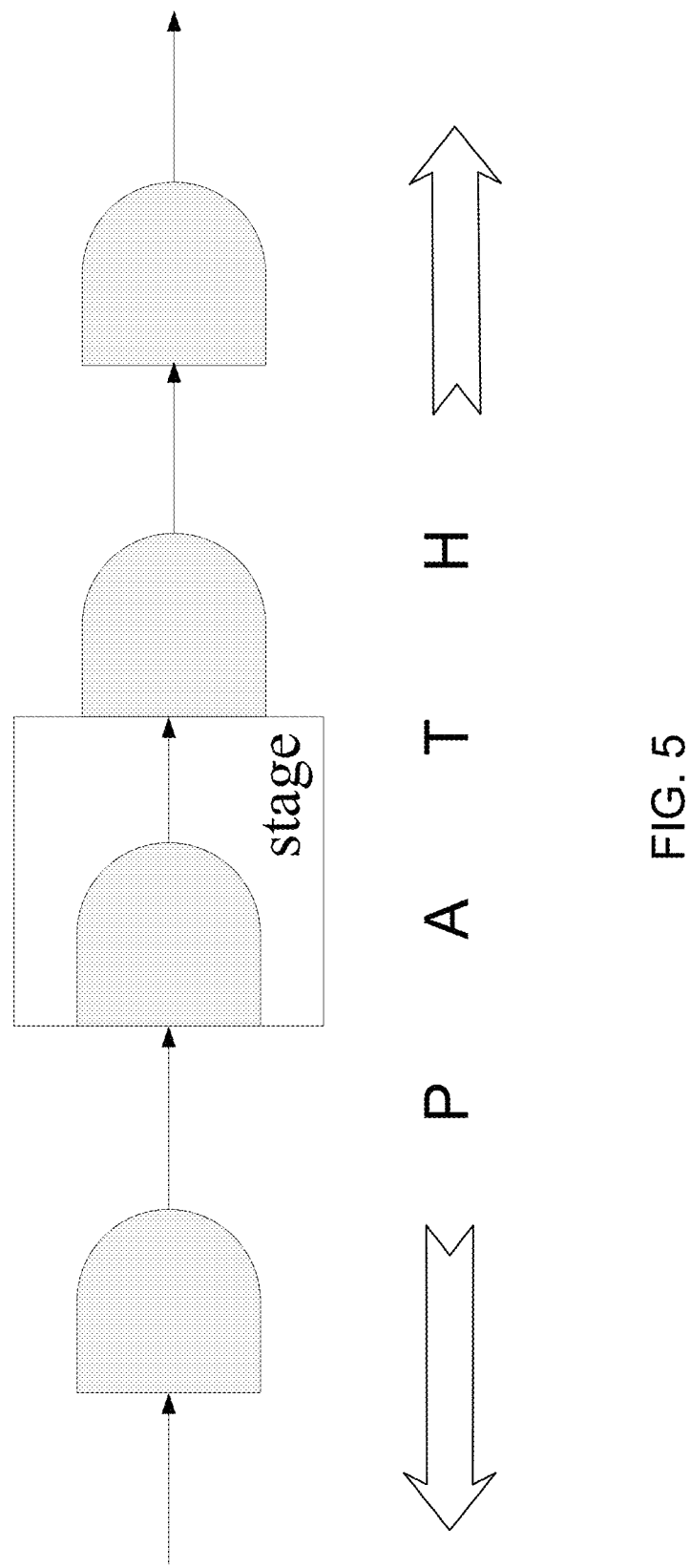
FIG. 5 is an example diagram showing a timing path composed of stages consistent with embodiments of the present disclosure.

Though the netlist is functionally complete, the netlist is very hard to understand and debug. The need for debugging often arises if the Spice and STA tool do not correlate. Debugging of SPICE correlation requires a high level of expertise and is an extremely time consuming task. Even if the user could identify the correlation error to a stage in the full path, there is no way to segregate the components of the stage from the full-path-netlist. FIG. 5 depicts an example showing the stages of a timing path. Examples of actual design situations that illustrate the problems in finding the component of interest from a pile of components are discussed in further detail below.

One of the issues with a SPICE deck created in a flattened netlist format involves common components on launch and capture path. For example, when the SPICE deck is created for path_type_full_clock part of path may be common between launch and capture, then it may not be possible to create the SPICE deck for launch and capture with min/max conditions using same instance name in the SPICE deck. To do this, existing tools would duplicate these devices and in process have modified names of net, instance, aggressors of common path, etc. (e.g., two nets may be coupled via a parasitic capacitance. One of the nets may be the aggressor and may interfere with a second, victim net via a coupling capacitance). Another common problem involves shared side receivers between stages. For example, there may be common side receiver between multiple stages in the path. The same instance would have to appear multiple times in the path once each for multiple stages, but SPICE does not allow for the same instance multiple times, as such there may be clones of the common instance. With multiple clones present in the flat netlist, it is very difficult to locate the actual device that the user intends to debug and/or analyze. Another problem involves the common aggressor between stages. Often, there may be a common aggressor attacking multiple stages in the path, a designer cannot instantiate an aggressor with the same name at multiple places. In order to handle this type of situation the designer needs to create a clone of the attacker. Each would have a different switching event timed to have a worst-case impact on the respective stage.

As described above, there are multiple problems in generating a flattened SPICE deck for an STA Path (PBA). The STA tool may be configured to divide a path into stages. In Embodiments of the present disclosure utilize a stage-based approach to create a timing path SPICE deck. Accordingly, the whole path may be divided into stages and from each STA-stage an equivalent SPICE-stage may be created. All of the SPICE-stages may then be connected to each other back-to-back in series to make the complete SPICE path.

In some embodiments, a SPICE-stage may be encapsulated inside a SUBCKT such that it is independent of other stages in the path. All components relevant to the stage are present in the same subckt/hierarchy and, as a result, the netlist may be far easier to understand and debug. Even if the same component needs to be present multiple times in the context of the path (e.g., a common attacker or a side-receiver), each occurrence will be in the context of its hierarchy formed by the subckt so original names from the netlist are usable with no editing required for cloning.

If a path is going through complex cells like ETM, RAM, custom cells for which SPICE data may be missing, embodiments of the present disclosure may be configured to allow the infrastructure to easily segment the path and measure the delays of segments independently.

Embodiments of the present disclosure may allow a designer to visualize how a STA path is divided into stages and for each STA stage there is a SPICE stage.

In some embodiments, to resemble the path based STA being performed into a SPICE deck, Path SPICE deck may be created by joining SPICE stages and each SPICE stage has a 1-1 correspondence to a STA stage. To create a SPICE deck for a STA path, one SPICE stage feeds to the next SPICE stage, etc., to generate a SPICE deck for the complete STA path.

Figure 7:
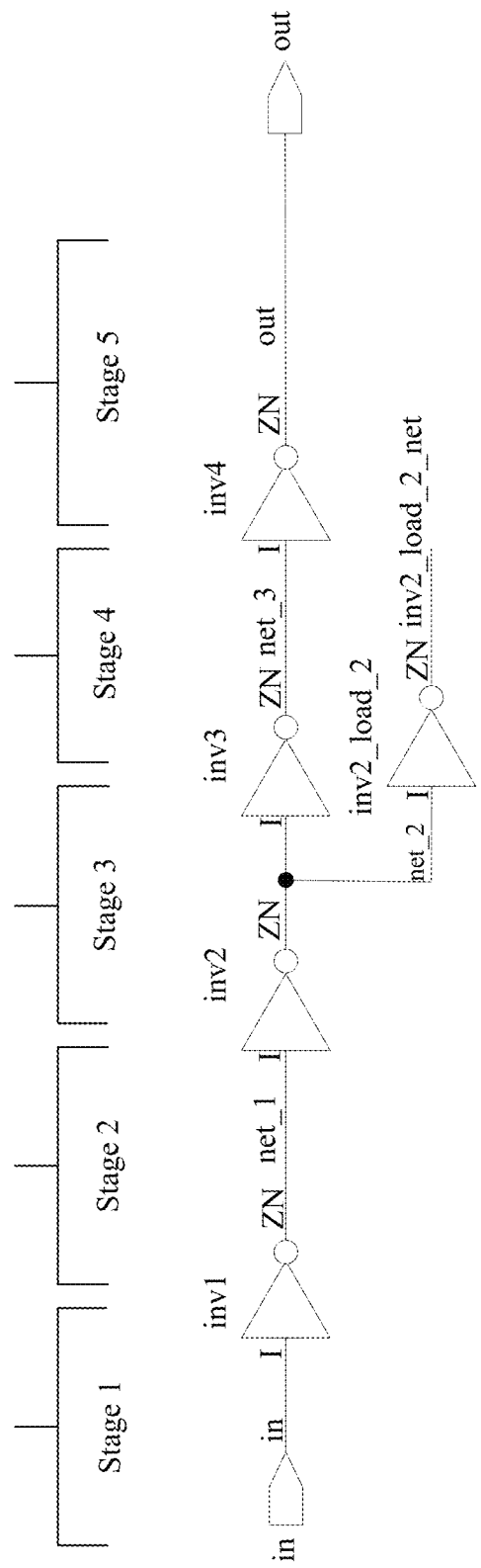
FIG. 7 is an example timing graph consistent with embodiments of the present disclosure.

Referring also to FIGS. 6-7, an example of the timing path report from a begin-point to the end-point and corresponding electronic circuit are provided. As shown in the Figures, the STA Path may be divided into a plurality of stages. For each stage, a corresponding SPICE stage may be created by encapsulating it inside a SUBCKT such that it is independent to the other stage in the path. A SPICE stage may expose only top level nodes to probe across timing point. Internal circuitry details of a SPICE stage remains in local scope of SPICE stage SUBCKT. After creating all the SPICE stages they may be connected back to back to create the SPICE deck for a complete timing PATH.

In some embodiments, in order to compute the SPICE delay and slew SPICE .MEASURE commands may be written on all timing points exposed by SPICE stage. The input transition to the SPICE path may be fed from the begin point and it may propagate through SPICE stages until reaching the end point. Examples of SPICE Stages and how they may be connected to make a complete SPICE path in accordance with the teachings of the present disclosure are provided below.

Figure 8:
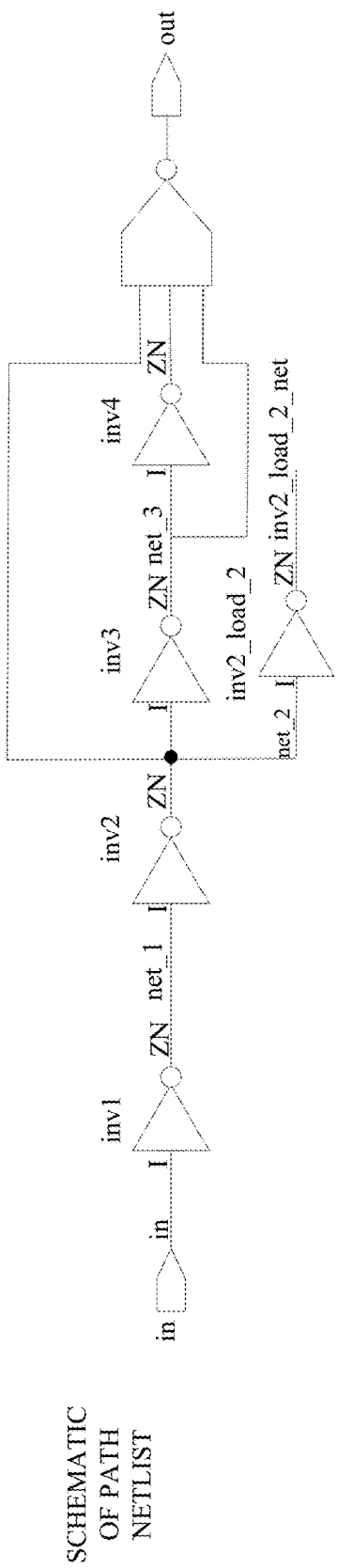
FIG. 8 is an example of a path netlist schematic consistent with embodiments of the present disclosure.
Figure 9:
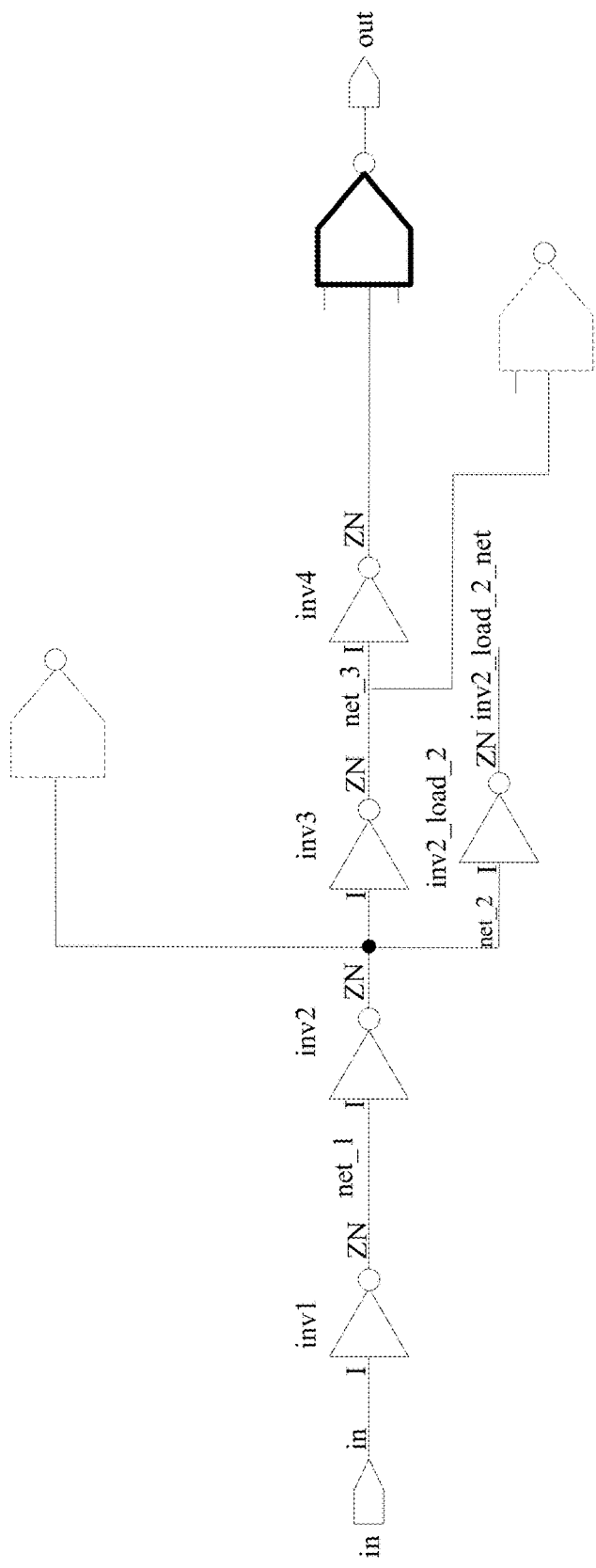
FIG. 9 is an example flat path spice schematic consistent with embodiments of the present disclosure.
Figure 10:
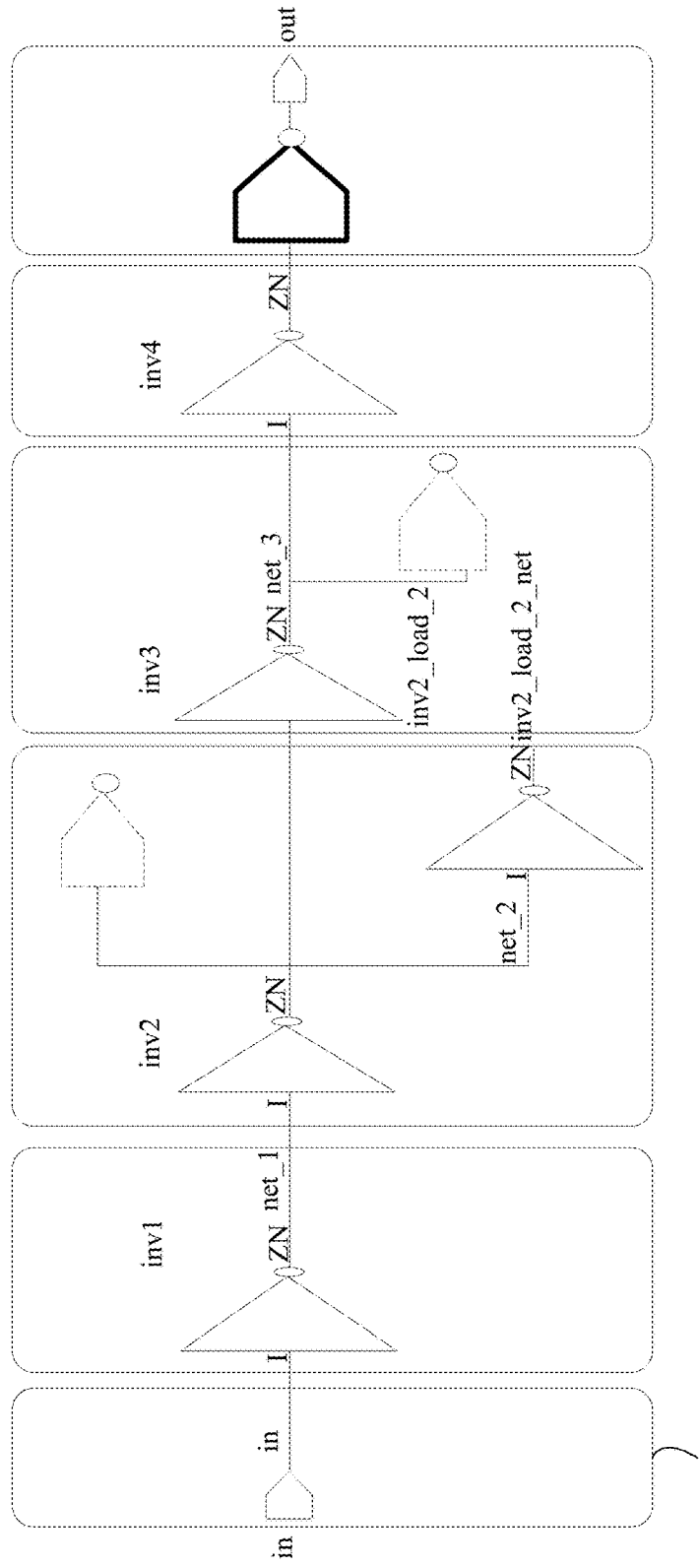
FIG. 10 is an example hierarchical path spice schematic consistent with embodiments of the present disclosure.

Referring also to FIGS. 8-10, embodiments showing a comparison of a flat vs hierarchical Spice based on SPICE-stages are provided. More specifically, FIG. 8 shows a schematic of a path netlist and FIG. 9 shows a flattened SPICE example where components in bold are clones of the dashed component with different names to represent the side receiver loading. FIG. 10 shows an example of a hierarchical path SPICE example where components in bold are clones of the dashed component with each clone retaining its name. Each box represents the SPICE hierarchy formed but includes a .subckt representing one STA stage.

In some embodiments, a SPICE stage may represent a SPICE deck of a STA stage. A stage may include various components. Some of these may include, but are not limited to, a driver instance, a net connected between driver and receivers instances, a load connected to the output of receiver, one or more aggressors if the SPICE deck is created with SI enabled, etc. The internal details of a stage such as its driver, receivers, aggressors and loads and their connectivity may be encapsulated inside a SUBCKT such that it is independent to other stages in the path. Accordingly, a SPICE Stage SUBCKT may expose only timing points of the STA stage such that a designer may probe (e.g., to measure delay/slew) at each of the timing points of the stage.

Figure 11:
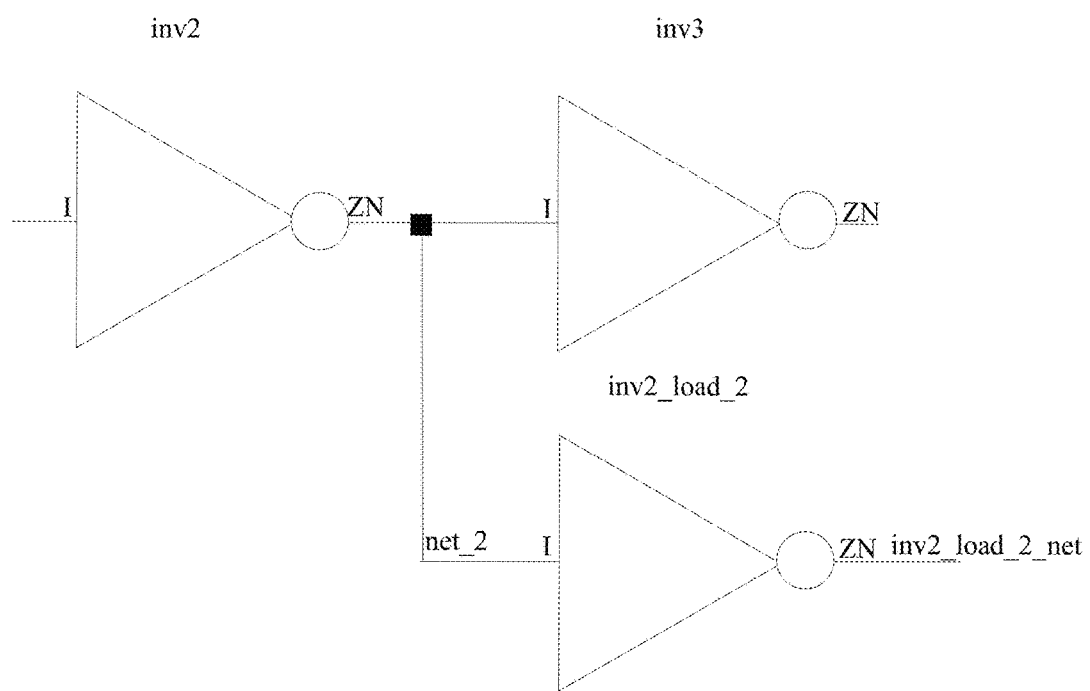
FIG. 11 is an example schematic depicting an STA stage consistent with embodiments of the present disclosure.

For example, and referring to FIG. 11, an example of a STA stage described from a timing path is provided (e.g., stage 3 from FIG. 7). In this particular example, the stage has a driver, two receivers and a net connecting the driver and receivers. To create a SPICE stage of the corresponding STA stage, internal construction (e.g., electric circuit) of the stage may be encapsulated inside a SUBCKT as described below.

The SUBCKT definition of SPICE stage exposes three nodes, namely inv2/I, inv2/ZN and inv3/I, such that when the SPICE stage is instantiated it may be possible to measure the delay and slew at the driver and receiver.

.SUBCKT Stage3 inv2/I inv2/ZN inv3/I
*driver Inst(inv2)
Xinv2 inv2/I inv2/ZN inv2/VDD inv2/VSS INV4
V1 inv2/VDD 0 0.72
V2 inv2/VSS 0 0
*side receiver Inst(inv2_load_2)
Xinv2_load_2    inv2_load_2/I    inv2_load_2/ZN
   inv2_load_2/VDD
inv2_load_2/VSS INV4
V3 inv2_load_2/VDD 0 0.72
V4 inv2_load_2/VSS 0 0
*Net victim vic(net_2)
R1 vic/6 vic/5 6.848
R2 vic/9 vic/5 8
R3 vic/4 vic/3 3.4668

R4 vic/9 vic/3 3.424
R5 vic/7 vic/8 8
R6 vic/3 vic/7 5.778
R7 vic/9 inv2/ZN 0.0001
R8 inv2/ZN inv2_load_2/I 0.0001
R9 inv2_load_2/I inv3/I 0.0001
C1 vic/3 0 8.223e-17
C2 vic/4 0 5.98e-17
C3 vic/5 0 4.308e-17
C4 vic/6 0 4.308e-17
C5 vic/7 0 5.749e-17
C6 vic/8 0 3.57e-17
C7 vic/9 0 1.466e-17
*Net connected to side receiver's o/p rcv2 (inv2_load_2_net)
C8 inv2_load_2/ZN 0 0
.ENDS In some embodiments, the internal construction of a SPICE stage is in the local scope of SUBCKT. Accordingly, they are independent to other stages in the path. As SPICE is name sensitive, it is not possible to have duplicate names in a flat SPICE deck (e.g. FIG. 9) but in a stage-based architecture duplicate names are not a problem. For example, a side receiver "inv2_load_2" instantiated in the above stage may also be instantiated in other SPICE stage in the same path. Also, an aggressor may attack multiple victims in the path so the same aggressor would appear in multiple SPICE stage without any naming conflict because each SPICE stage would have its own aggressor's receivers in its local scope.

In some embodiments, after defining a stage SUBCKT definition, it may be instantiated. The following example shows how Stage3 SUBCKT from the timing path discussed above may be instantiated. SPICE stages may be instantiated such that they can form a timing path.

XStage3 inv2/I inv2/ZN inv3/I Stage3

In some embodiments, once a SPICE stage has been defined and instantiated the delay and slew may be measured at each timing point of the SPICE stage. As is shown in the example SPICE measurement below, there are two delay measure written to measure delay across driver (inv2) instance and net (between driver output and receiver input). There are two slew measurements to measure the slew at both the driver output and receiver input.

.MEASURE TRAN Stage_0004_DELAY_inv2/I_DELAY_inv2/ZN
+TRIG V(inv2/I) VAL=0.36 FALL=LAST
+TARG V(inv2/ZN) VAL=0.36 RISE=LAST
.MEASURE TRAN Underated_Stage_0004_SLEW
+TRIG V(inv2/ZN) VAL=0.216 RISE=LAST
+TARG V(inv2/ZN) VAL=0.504 RISE=LAST
.MEASURE TRAN Stage_0004_SLEW_inv2/ZN_SLEW param=
'Underated_Stage_0004_SLEW/0.5'
.MEASURE TRAN Stage_0005_DELAY_inv2/ZN_DELAY_inv3/I
+TRIG V(inv2/ZN) VAL=0.36 RISE=LAST
+TARG V(inv3/I) VAL=0.36 RISE=LAST
.MEASURE TRAN Underated_Stage_0005_SLEW
+TRIG V(inv3/I) VAL=0.216 RISE=LAST
+TARG V(inv3/I) VAL=0.504 RISE=LAST
.MEASURE TRAN Stage_0005_SLEW_inv3/I_SLEW param=
'Underated_Stage_0005_SLEW/0.5'

Similar to the one SPICE stage defined above for the timing path, embodiments included herein allow for defining SUBCKTs of all the stages in the path. For simplicity this example has omitted internal definition of SPICE stage the manner in which SPICE stages may be connected to make path SPICE deck is provide below.

```
* --------------------
*Stage subckts
* --------------------
.SUBCKT Stage1 in inv1
* --------------------
.ENDS
.SUBCKT Stage2 inv1/I inv1/ZN inv2/I
* --------------------
.ENDS
.SUBCKT Stage3 inv2/I inv2/ZN inv3/I
* --------------------
.ENDS
.SUBCKT Stage4 inv3/I inv3/ZN inv4/I
* --------------------
.ENDS
.SUBCKT Stage5 inv4/I inv4/ZN out
* --------------------
.ENDS
* --------------------
```

Once the SPICE stages are defined they are instantiated such they are connected to back to back to make complete path, as shown below:

```
* --------------------
*Stage Instances
* --------------------
XStage1 in inv1/I Stage1
XStage2 inv1/I inv1/ZN inv2/I Stage2
XStage3 inv2/I inv2/ZN inv3/I Stage3
XStage4 inv3/I inv3/ZN inv4/I Stage4
XStage5 inv4/I inv4/ZN out Stage5
* --------------------
```

As shown above, the instantiations inv1/I of Stage1 is input to the Stage2, output inv2/I of Stage2 is the input of Stage3 and so on to make complete path from IN to OUT.

In some embodiments, Input IN of the stage1 of SPICE deck may be connected with stimuli or input event as shown below:

```
* --------------------
*Input Event
* --------------------
V1 in 0 PWL(
+9.99999971718e-10 0
+1.00154431406e-09 0.072
+1.00224243314e-09 0.144
+1.00300154488e-09 0.216
+1.0038535966e-09 0.288
+1.0047931584e-09 0.36
+1.00584250651e-09 0.432
+1.00700796573e-09 0.504
+1.00829143819e-09 0.576
+1.00970431842e-09 0.648
+1.01124997959e-09 0.72
+)
* --------------------
```

As shown above, in some embodiments, the SPICE MEASURE techniques may be written for a SPICE stage. Additionally and/or alternatively, they may be similarly written for other stages, so that SPICE delay/slew measurement may be achieved at all timing points in the path.

.MEASURE TRAN Stage_0001_DELAY_in_DELAY_inv1/I
+TRIG V(in) VAL=0.36 RISE=LAST
+TARG V(inv1/I) VAL=0.36 RISE=LAST
.MEASURE TRAN Underated_Stage_0001_SLEW +TRIG V(inv1/I) VAL=0.216 RISE=LAST
+TARG V(inv1/I) VAL=0.504 RISE=LAST
.MEASURE TRAN Stage_0001_SLEW_inv1/I_SLEW param=
'Underated_Stage_0001_SLEW/0.5'
.MEASURE TRAN Stage_0002_DELAY_inv1/I_DELAY_inv1/ZN
+TRIG V(inv1/I) VAL=0.36 RISE=LAST
+TARG V(inv1/ZN) VAL=0.36 FALL=LAST
.MEASURE TRAN Underated_Stage_0002_SLEW
+TRIG V(inv1/ZN) VAL=0.504 FALL=LAST
+TARG V(inv1/ZN) VAL=0.216 FALL=LAST
.MEASURE TRAN Stage_0002_SLEW_inv1/ZN_SLEW param=
'Underated_Stage_0002_SLEW/0.5'
.MEASURE TRAN Stage_0003_DELAY_inv1/ZN_DELAY_inv2/I
+TRIG V(inv1/ZN) VAL=0.36 FALL=LAST
+TARG V(inv2/I) VAL=0.36 FALL=LAST
.MEASURE TRAN Underated_Stage_0003_SLEW
+TRIG V(inv2/I) VAL=0.504 FALL=LAST
+TARG V(inv2/I) VAL=0.216 FALL=LAST
.MEASURE TRAN Stage_0003_SLEW_inv2/I_SLEW param=
'Underated_Stage_0003_SLEW/0.5'
.MEASURE TRAN Stage_0004_DELAY_inv2/I_DELAY_inv2/ZN
+TRIG V(inv2/I) VAL=0.36 FALL=LAST
+TARG V(inv2/ZN) VAL=0.36 RISE=LAST
.MEASURE TRAN Underated_Stage_0004_SLEW
+TRIG V(inv2/ZN) VAL=0.216 RISE=LAST
+TARG V(inv2/ZN) VAL=0.504 RISE=LAST
.MEASURE TRAN Stage_0004_SLEW_inv2/ZN_SLEW param=
'Underated_Stage_0004_SLEW/0.5'
.MEASURE TRAN Stage_0005_DELAY_inv2/ZN_DELAY_inv3/I
+TRIG V(inv2/ZN) VAL=0.36 RISE=LAST
+TARG V(inv3/I) VAL=0.36 RISE=LAST
.MEASURE TRAN Underated_Stage_0005_SLEW
+TRIG V(inv3/I) VAL=0.216 RISE=LAST
+TARG V(inv3/I) VAL=0.504 RISE=LAST
.MEASURE TRAN Stage_0005_SLEW_inv3/I_SLEW param=
'Underated_Stage_0005_SLEW/0.5'
.MEASURE TRAN Stage_0006_DELAY_inv3/I_DELAY_inv3/ZN
+TRIG V(inv3/I) VAL=0.36 RISE=LAST
+TARG V(inv3/ZN) VAL=0.36 FALL=LAST
.MEASURE TRAN Underated_Stage_0006_SLEW
+TRIG V(inv3/ZN) VAL=0.504 FALL=LAST
+TARG V(inv3/ZN) VAL=0.216 FALL=LAST
.MEASURE TRAN Stage_0006_SLEW_inv3/ZN_SLEW param=
'Underated_Stage_0006_SLEW/0.5'
.MEASURE TRAN Stage_0007_DELAY_inv3/ZN_DELAY_inv4/I
+TRIG V(inv3/ZN) VAL=0.36 FALL=LAST
+TARG V(inv4/I) VAL=0.36 FALL=LAST
.MEASURE TRAN Underated_Stage_0007_SLEW
+TRIG V(inv4/I) VAL=0.504 FALL=LAST
+TARG V(inv4/I) VAL=0.216 FALL=LAST
.MEASURE TRAN Stage_0007_SLEW_inv4/I_SLEW param=
'Underated_Stage_0007_SLEW/0.5'
.MEASURE TRAN Stage_0008_DELAY_inv4/I_DELAY_inv4/ZN
+TRIG V(inv4/I) VAL=0.36 FALL=LAST
+TARG V(inv4/ZN) VAL=0.36 RISE=LAST
.MEASURE TRAN Underated_Stage_0008_SLEW
+TRIG V(inv4/ZN) VAL=0.216 RISE=LAST
+TARG V(inv4/ZN) VAL=0.504 RISE=LAST
.MEASURE TRAN Stage_0008_SLEW_inv4/ZN_SLEW param=
'Underated_Stage_0008_SLEW/0.5'
.MEASURE TRAN Stage_0009_DELAY_inv4/ZN_DELAY_out
+TRIG V(inv4/ZN) VAL=0.36 RISE=LAST
+TARG V(out) VAL=0.36 RISE=LAST
.MEASURE TRAN Underated_Stage_0009_SLEW
+TRIG V(out) VAL=0.144 RISE=LAST
+TARG V(out) VAL=0.576 RISE=LAST
.MEASURE TRAN Stage_0009_SLEW_out_SLEW param=
'Underated_Stage_0009_SLEW/0.5'

The design and structure of applying Stage based techniques to generate hierarchical Path Spice deck is presently employed for delay (both non-SI and SI) validation. However, the teachings of the present disclosure are extendable and may be applied to any suitable approach. Some of which may include, but are not limited to, generating decks for clock-network analysis (including clock mesh) in Spice as well as glitch analysis with propagation, etc.

Figure 12:
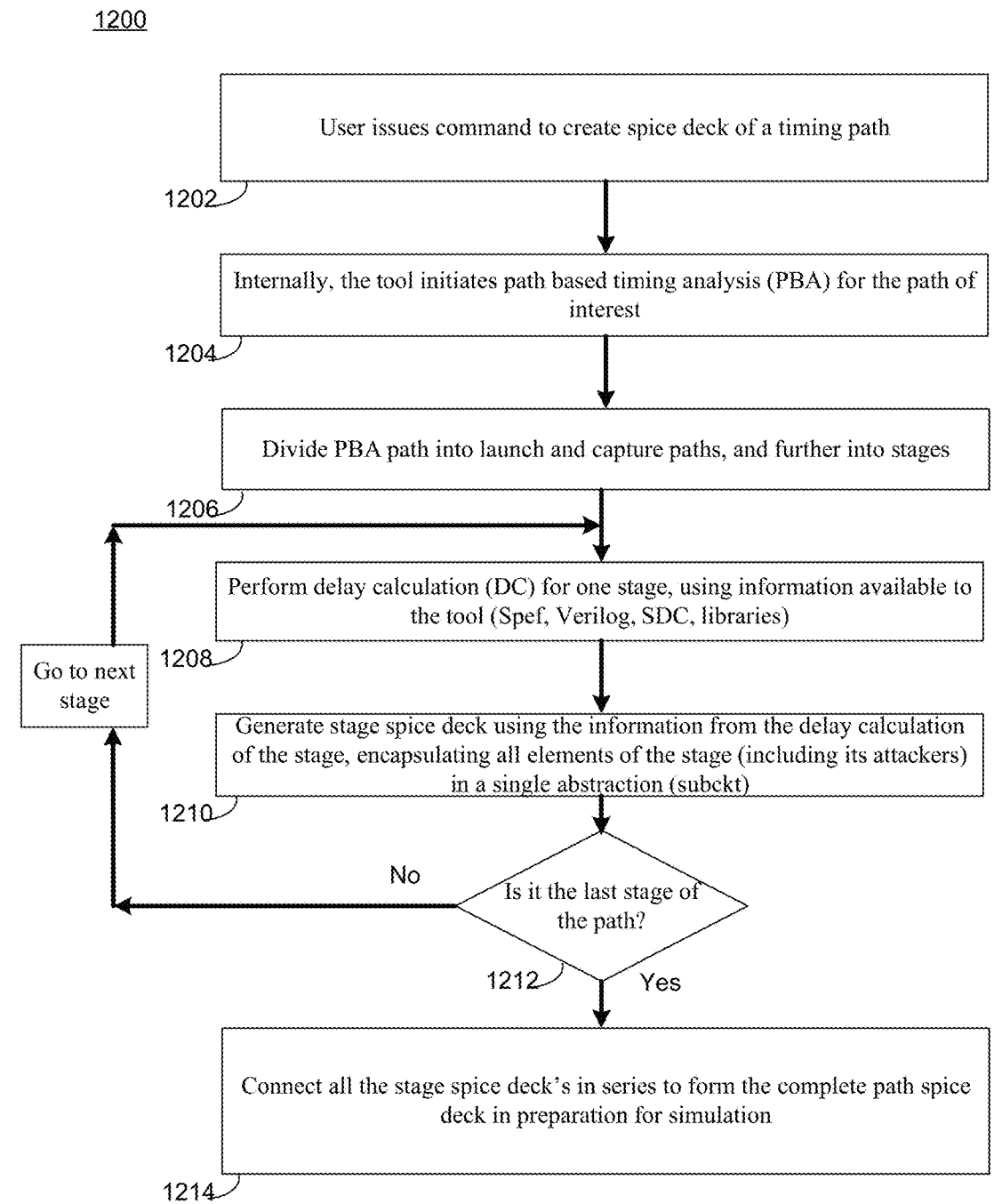
FIG. 12 is a flowchart depicting operations consistent with an exemplary embodiment of the stage based process described herein.
Figure 13:
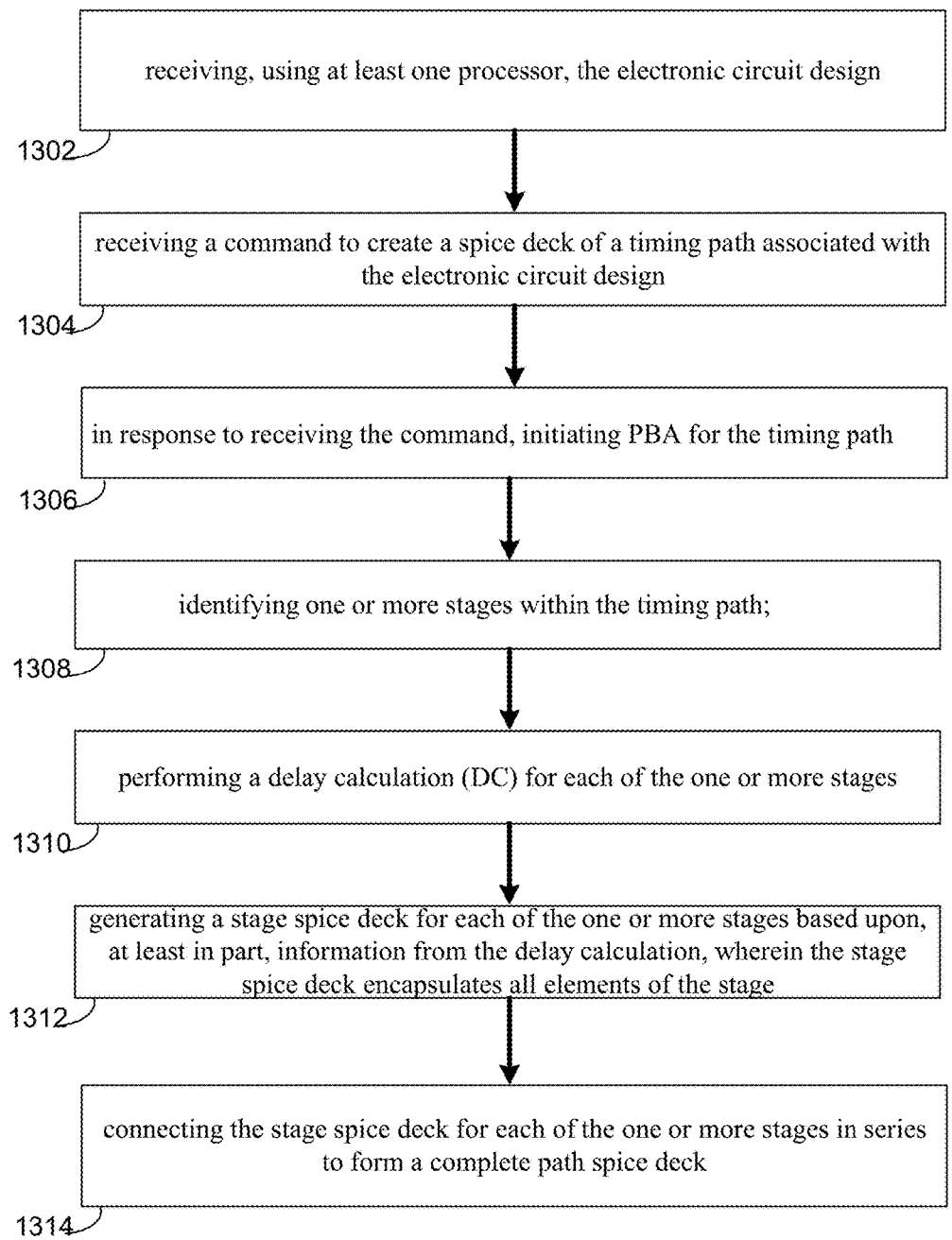
FIG. 13 is a flowchart depicting operations consistent with an exemplary embodiment of the stage based process described herein.

Referring now to FIGS. 12-13 embodiments consistent with the stage-based process described herein are provided. FIG. 12 depicts a flowchart 1200 that includes an embodiment for performing Path-Based Analysis (PBA) of an electronic circuit design using one or more stages. The method may include receiving (1202) a command to create spice deck of a timing path from a user. Internally, the tool may initiate (1204) path based timing analysis (PBA) for the path of interest. The method may include dividing (1206) PBA path into launch and capture paths, and further into stages. The method may also include performing (1208) delay calculation (DC) for one stage, using information available to the tool (Spef, Verilog, design constraints, libraries, etc.). The method may also include generating (1210) stage spice deck using the information from the delay calculation of the stage, encapsulating all elements of the stage (including its attackers) in a single abstraction (sub-ckt). The method may further include determining (1212) if the last stage has been reached. The method may also include connecting (1214) all the stage spice decks in series to form the complete path spice deck in preparation for simulation.

FIG. 13 depicts a flowchart 1300 that includes another embodiment for performing Path-Based Analysis (PBA) of an electronic circuit design using one or more stages. The method may include receiving (1302), using at least one processor, the electronic circuit design and receiving (1304) a command to create a spice deck of a timing path associated with the electronic circuit design. In response to receiving the command, the method may include initiating (1306) PBA for the timing path and identifying (1308) one or more stages within the timing path. The method may also include performing (1310) a delay calculation (DC) for each of the one or more stages. The method may further include generating (1312) a stage spice deck for each of the one or more stages based upon, at least in part, information from the delay calculation, wherein the stage spice deck encapsulates all elements of the stage and connecting (1314) the stage spice deck for each of the one or more stages in series to form a complete path spice deck.

Figure 14:
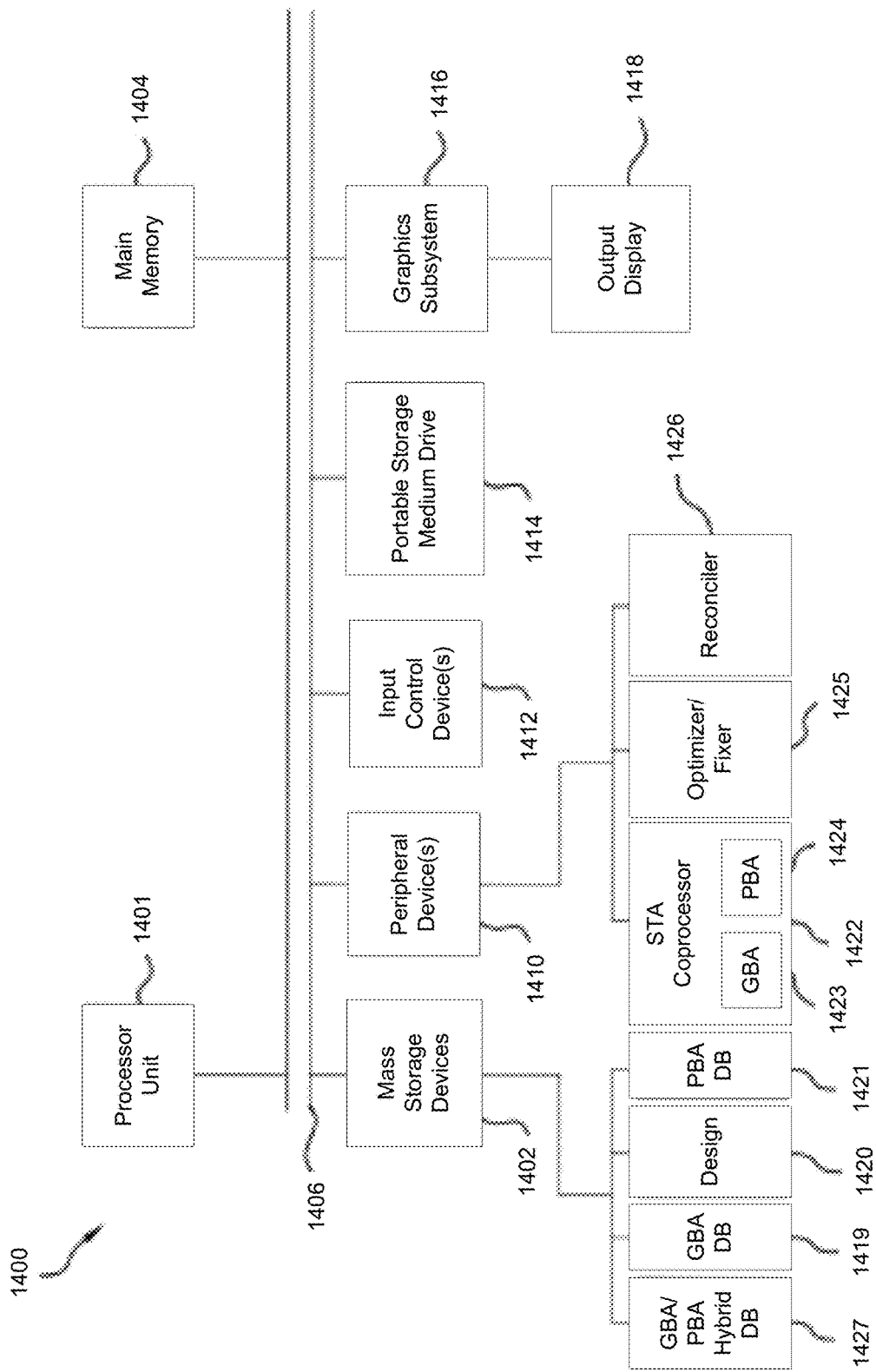
FIG. 14 is a block diagram illustrating an exemplary interconnection of components in a processor-based system for implementing an exemplary embodiment of the stage based process described herein.

Turning to FIG. 14, an exemplary block diagram of a computer system for hosting and/or executing an exemplary configuration of the disclosed system and method respectively is illustrated. A computer system 1400 contains a processor unit 1401, a main or primary memory 1404, an interconnect bus 1406, a mass storage device 1402, peripheral device(s) 1410, input control device(s) 1412, portable storage drive(s) 1414, a graphics subsystem 1410, and an output display 1418, amongst other components (components may be used herein at varying levels such as a gate component or a black-box type component such as, for example, the main memory component). Processor unit 1401 may include a single microprocessor or a plurality of microprocessors for configuring computer system 1400 as a multi-processor system, additionally, each physical processor unit 1401 may include a plurality of cores. Main memory 1404 stores, in part, instructions and data to be executed by processor 1401 along with circuit design data including timing data. Main memory 1404 preferably includes banks of dynamic random access memory (DRAM) as well as high-speed cache memory, such as static random access memory (SRAM) at various levels of the system architecture.

For the purpose of simplicity, the components of computer system 1400 are shown connected via interconnect bus 1406. However, computer system 1400 may be connected through one or more data transport means. Mass storage device 1402', which may be implemented with a magnetic disk drive, an optical disk drive, a solid state device, an attachment to network storage, cloud storage, a RAID arraying any of the above, and the like, is preferably a non-volatile storage device for storing data, databases, and instructions, to be used by processor unit 1401. In certain configurations, mass storage device 1402' may store portions of the software to load it into main memory 1404 or into a firmware or rom.

Portable storage medium drive 1414 operates in conjunction with a portable non-volatile storage medium such as a floppy disk, a compact disk read only memory (CD-ROM), or a digital versatile/video disk read only memory (DVD-ROM), to input and output data and code to and from the computer system 1400. In one configuration, software portions, circuit design data, and the like are stored on such a portable medium, and are input to computer system 1400 via portable storage medium drive 1414.

Peripheral device(s) 1410 may include any type of computer support device such as an input/output (I/O) interface, to add additional functionality to computer system 1400. For example, peripheral device(s) 1410 may include additional network interface cards to interface computer system 1400 to additional networks. Peripheral devices may include further specialized processors such as clustered video cards utilizing graphics processor unit (GPU) floating point processing logic to supplement or supplant CPU processing. Dynamically configurable logic such as, for example, field programmable gate arrays (FPGAs) may also be coupled to system 1400 through peripheral device(s) block 310. Still further, specialized application specific integrated circuits (ASICS) may be coupled thereto to implement specialized logic to accelerate or implement certain portions of the invention such as a timing analysis module, a data reduction module, and a correction module including an physical implementation optimizer engine. Such modules may be given direct access to memory (DMA) and may have their own memory integrated therein. Additionally, a rapid circuit prototype fabrication unit may be coupled to the system via a backplane or system IO port. Such fabrication unit may include, for example, a lithographic or 3d additive printer, operable to physically fabricate a circuit design defined by physical implementation data.

Input control device(s) 1412 provide a portion of the user interface for a computer system 1400 user. Input control device(s) 1412 may include an alphanumeric keypad for inputting alphanumeric and other key information; and a cursor control device such as a mouse, a track pad or stylus; or cursor direction keys.

In order to display textual and graphical information, computer system 1400 contains graphic subsystem 1410 and output display(s) 1418. Output display 1418 may include a cathode ray tube (CRT) display, liquid crystal display (LCD), active matrix organic light emitting diode (AMOLED), plasma display, projector, or the like. Graphic subsystem 1410 receives textual and graphical information and processes the information for output to display 1418.

A GBA database 1419, design database 1420, PBA database 1421, and GBA/PBA hybrid database 1427 are coupled to mass storage devices 1402. An STA coprocessor 1422 containing a GBA processing module 1423 and a PBA processing module 1424 is coupled to peripheral devices 1410. An optimizer fixer module 1425 is coupled to peripheral devices 1410 as well as a database reconciler module 1426.

In a software implementation, the portions of software for certain measures may include a plurality of computer executable instructions, to be implemented on a computer system such as system 1400. Prior to loading in the computer system 1400 or firmware, the software may reside as encoded information on a computer-readable tangible medium such as a magnetic floppy disk, a magnetic tape, CD-ROM, DVD-ROM, flash memory, network attached storage (NAS), or any other suitable computer readable medium. Such software may control multiplexors, selectors, field programmable gate arrays (FPGAs), or the like to implement logical control of timing analysis, endpoint ranking, likely pessimism identification, likely PBA pessimism reduction nodes, path identification, and/or physical implementation optimization features.

In an illustrative implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Figure 15:
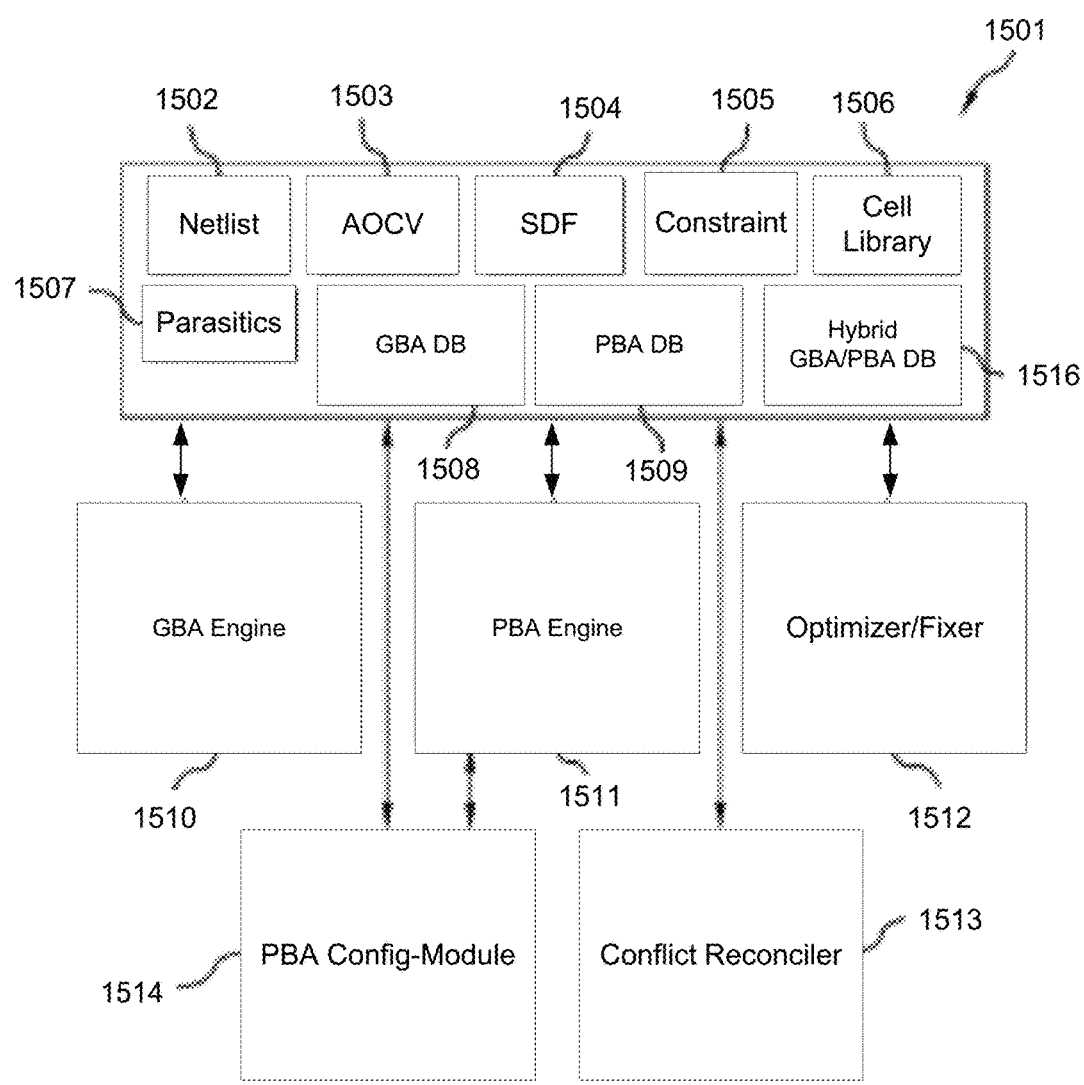
FIG. 15 is a block diagram illustrating an exemplary interconnection of components in a system for implementing an exemplary embodiment of the stage based process described herein.

As seen in FIG. 15, a storage module 1501 contains a plurality of databases, data stores, or data items including parasitics 1507, netlist data 1502 defining the circuit design, AOCV derate information 1503, standard delay format (SDF) 1504, constraint information 1505, cell library 1506, GBA timing database 1508, PBA timing database 1509, and GBA/PBA hybrid database 1516. Though GBA database 1508 and PBA database 1509 have been shown separately, these may be separately kept or merely one database may be kept for the first initial GBA values which are selectively fed by the PBA analyzer into the original GBA database rather than creating a separate PBA database and merging the two. Alternatively GBA database 1508 and PBA database 1509 may be left unchanged, but values may be taken from each to form a composite, hybrid GBA/PBA database 1516. The GBA engine 1510 takes various inputs such as 1502-1507 as data inputs in building a persistent model of the circuit and computing required and actual arrival times of signals at each of the nodes throughout the circuit. Upon completion of the GBA engine, the measured operational timing characteristics are recorded into the GBA database 1508.

PBA configuration module 1504 selectively sets a plurality of settings of the PBA analyzer according to designer input and determined allowed runtime, amongst other factors. Additionally, the PBA configuration module (based upon the configuration settings) analyzes the GBA database, preferably ranking it by magnitude and selecting the most critical paths thereof as candidates to be passed to the PBA engine 1511 for selective targeted pessimism removal therein. Upon arriving at a finalized configuration, the PBA engine 1511 is selectively executed according to the PBA configuration module 1514's determined configuration therefor. PBA engine 1511 receives the configuration settings and accesses the recorded operational timing characteristics stored in a GBA database 1508 according to the configuration thereof to select, rank, or identify the most critical violations determined in the GBA database 1508. PBA engine 1511 is then executed to re-evaluate those most critical selected nodes or paths for re-evaluation thereof and subsequent recordation into PBA database 1509. The updated, reduced pessimism operational timing characteristics are recorded in the PBA database 1509. The conflict reconciler 1513 traverses through the PBA database correlating GBA nodes with re-evaluated PBA nodes and selectively replacing GBA data with PBA data in the GBA database. Alternatively, the conflict reconciler 1513 may supplement PBA re-evaluated nodes in the PBA database 1509 with default GBA database values contained in the GBA database 1508 to thereby form a hybrid GBA and PBA database for output to optimizer module 1512 for subsequent fixing thereof.

Alternatively, a new composite hybrid GBA/PBA database 1516 may be created with selectively retrieved values from GBA database 1508 and PBA database 1509. Conflict reconciler 1513 may be employed to selectively retrieve PBA values and GBA values from PBA database 1509 and GBA database 1508 respectively merging the two into a new composite third database 1516. The new composite third database 1516 can be generated in encrypted/binary/ascii format and is preferably an independent representation of timing and signal integrity effects of a given design. While the GBA/PBA hybrid approach herein has been described in terms of STA, such approaches may be employed with any of the various flavors/varieties of signoff such as, for example, static, statistical, and the like. STA herein also may be employed with signal integrity analysis.

Conflict reconciler 1513 additionally propagates new PBA values through the timing graph or timing database according to predetermined static timing analysis rules and practices and determines conflict with upstream nodes and downstream nodes based on neighboring nodes. One such conflict is GBA vs. PBA values. PBA values should be used where available. Another such STA rule leading to inconsistencies is that a fan out cannot be less critical than any fan-in slack value. Such conflicts are addressed by selectively propagating other values based upon a predetermined ranking of PBA values versus original GBA values, upstream, and downstream neighboring nodes. The embodiments depicted in FIGS. 14-15 may include any or all of the SPICE related processes and embodiments discussed herein.

Referring again to FIG. 1C, various inputs and outputs that may be associated with a static timing analysis are provided. Some of these may include but are not limited to, netlists, library models, parasitic information, timing derates, standard delay format information, system level constraints, etc. In some embodiments, the term "netlist" may refer to a model that defines the digital circuit that is being envisioned. Generally, a gate level netlist is provided as an input model to define the desired functionality. Various types of library models may also be required to perform static timing analysis. Some of these may include, but are not limited to, Liberty format specified .lib library models for defining the delays of standard digital gates (AND, OR, NOT, FLOP, LATCH etc.) and MACROS, AOCV models for performing advanced STA, CDB models for performing SI analysis, etc. STA may also include parasitic input information. Similar to gates, for interconnects also there exist models which are generally specified in the Standard Parasitic Exchange Format ("SPEF"). Timing Derates are a means to model the variation impact generally during STA. The standard delay format ("SDF") is another means of specifying the inputs delays of gates and interconnects. System level constraints generally include a set of input constraints are applied which define the desired timing that is envisioned from the digital circuit under consideration.

In some embodiments of the present disclosure, STA may include a set of timing reports that classify the entire electronic design into various number of paths (e.g., subsections of digital circuits) and then state whether each path is meeting the set constraints. These timing reports may include both graph based analysis ("GBA") and path based analysis ("PBA"). In GBA, after reading inputs, the first step that happens is building a persistent model of STA. In this way, a timing graph may be generated internally for the given netlist and then the worst arrival and required times on the nodes of the graph may be computed. For certain nodes which may be characterized as endpoints, it also computes the worst slack. PBA may function as an extension to GBA and may be used to target pessimism reduction (and optimism also in certain cases where GBA today cannot cater to the requirements like waveform propagation due to compute and resource intensive tasks) that has been introduced at various stages of GBA. Various types of pessimism introduced during GBA analysis may include, but are not limited to, slew merging pessimism impacting delay computation on the timing network, graph based derating factors (advanced on-chip-variation factors), and signal Integrity (SI) effects.

In some embodiments, after reading inputs, the first step may include building a persistent model of STA. Accordingly, a timing graph for the given netlist may be generated and then the worst arrival and required times on the nodes of the graph may be determined. For certain nodes which may be characterized as endpoints, the worst slack may also be computed.

In some designs, multiple sources of pessimism in GBA leave no choice but to use PBA as their criteria for sign-off. However, one of the major sign-off problems with PBA is ensuring that the designer has uncovered all of the possible failures in the design. With increasing design sizes and complexity, this is a challenging task as it is often marred with capacity, performance, time to market, and power and area (PPA) challenges.

Software implementation methods for technologies like advanced on-chip variation ("AOCV"), slew merging, voltage changes and statistical on-chip variation ("SOCV"), statistical timing analysis ("SSTA"), pessimism in timing analysis and signal integrity (SI) continue to add additional complexities as they significantly increase GBA—PBA gap. Due to these limitations, slack wall invariably contain millions of violating GBA slack paths even during the final sign-off stages. Often there are certain specific endpoints which potentially have a high nworst coverage (e.g., millions of path leading to that endpoint) and this complicates things further for PBA.

While exhaustive PBA methods exist, true worst path identification in these existing PBA systems is extremely time intensive due to the issues described above. The problem of guaranteeing worst path is marred with intractable runtimes. To circumvent these performance issues, software can place limits for performing depth search, however, that leads to inaccuracies. It also leads to incomplete coverage of the design which acts as a deterrent to sign-off using PBA since violations tend to spread out in the various logic cones of the designs. Thus, with high numbers of endpoint violations and significantly large depth search space, it may be nearly impossible to provide full design coverage.

Another problem is that existing tools do not have all the designer knowledge modeled into the software so there is a need to have path handles that users can utilize to filter irrelevant paths. While software has evolved significantly to model designer knowledge to some extent, the gap is wide and every design potentially is different and may need specific tuning for better performance. In situations where many paths are failing, having a means to filter out certain paths that the designer may want to exclude for various reasons may significantly boost performance.

As discussed above, modern static timing analysis is performed without requiring SPICE simulation of any given digital circuit using software techniques and certain models that provide relevant characteristics of the digital circuit. In existing tools, the SPICE netlist represents the cells/devices which form the path, their related components like receivers, attackers and their drivers all as single monolithic flat netlist. The netlist is standard SPICE syntax and can be simulated in any commercial simulator. Though the netlist is functionally complete, the netlist is very hard to understand/debug, as the need would often arise in case the Spice and STA tool do not correlate. This made debugging of SPICE extremely difficult and a time consuming task. Even if the user could identify the mis-correlation to a stage in the full path, there is no way to segregate the components from the full-path netlist.

Accordingly, embodiments of the present disclosure may be used to extend the division of STA path into stages, and drive this concept into SPICE deck creation such that for each STA stage there is a SPICE stage, encapsulated inside a SUBCKT such that it is independent to other stages in the path. All components relevant to the stage may be present in the same subckt/hierarchy and so makes the netlist very easy to understand and debug.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for performing Path-Based Analysis (PBA) of an electronic circuit design using one or more stages comprising:
   receiving, using at least one processor, the electronic circuit design;
   receiving, using the at least one processor, a command to create a spice deck of a timing path associated with the electronic circuit design;
   in response to receiving the command, initiating PBA for the timing path, using the at least one processor;
   identifying, using the at least one processor, one or more stages within the timing path;
   performing, using the at least one processor, a delay calculation (DC) for each of the one or more stages;
   generating, using the at least one processor, a stage spice deck for each of the one or more stages based upon, at least in part, information from the delay calculation, wherein the stage spice deck encapsulates all elements of the stage;
   connecting, using the at least one processor, the stage spice deck for each of the one or more stages in series to form a complete path spice deck;
   simulating and debugging the complete path spice deck; and
   fabricating, based upon, at least in part a debugged complete path spice deck, a debugged electronic circuit design.

2. The computer-implemented method of claim 1 further comprising:
   determining if the timing path includes a complex cell;
   segmenting at least a portion of the timing path; and
   measuring a delay associated with at least one segmented portion.

3. The computer-implemented method of claim 2 further comprising:
   if a last stage has not been reached, iteratively performing the delay calculation and the generating of the stage spice deck.

4. The computer-implemented method of claim 2 wherein connecting the stage spice deck occurs after determining that a last stage has been reached.

5. The computer-implemented method of claim 1 wherein performing the delay calculation is based upon, at least in part, at least one of standard parasitic exchange format ("Spef"), Verilog, design constraint files, and library information.

6. The computer-implemented method of claim 1 wherein encapsulating all elements of the stage includes encapsulating one or more attackers in a single abstraction.

7. The computer-implemented method of claim 1 wherein the timing path is a static timing analysis (STA) path.

8. A system for performing Path-Based Analysis (PBA) of an electronic circuit design using one or more stages comprising:
   a computing device having at least one processor configured to simulate the electronic circuit design, the at least one processor configured to receive a command to create a spice deck of a timing path associated with the electronic circuit design, in response to receiving the command, the at least one processor further configured to initiate PBA for the timing path and to identify one or more stages within the timing path, the at least one processor further configured to perform a delay calculation (DC) for each of the one or more stages, the at least one processor configured to generate a stage spice deck for each of the one or more stages based upon, at least in part, information from the delay calculation, wherein the stage spice deck encapsulates all elements of the stage, the at least one processor further configured to connect the stage spice deck for each of the one or more stages in series to form a complete path spice deck, the at least one processor further configured to simulate and debug and complete path spice deck the system further configured to fabricate, based upon, at least in part a debugged complete path spice deck, a debugged electronic circuit design.

9. The system of claim 8 wherein the spice deck is associated with at least one of a clock-network analysis, a clock mesh analysis, and a glitch analysis.

10. The system of claim 9 wherein
    if the final stage has not been reached, the computing device is further configured to iteratively perform the delay calculation and the generating the stage spice deck.

11. The system of claim 9 wherein connecting the stage spice deck occurs after determining that a last stage has been reached.

12. The system of claim 8 wherein performing the delay calculation is based upon, at least in part, at least one of standard parasitic exchange format ("Spef"), Verilog, design constraint files, and library information.

13. The system of claim 8 wherein encapsulating all elements of the stage includes encapsulating one or more attackers in a single abstraction.

14. The system of claim 8 wherein the timing path is a static timing analysis (STA) path.

15. A computer-implemented method for performing Path-Based Analysis (PBA) of an electronic circuit design using one or more stages comprising:

receiving, using at least one processor, a command to create a spice deck of a timing path associated with the electronic circuit design;

in response to receiving the command, initiating PBA for the timing path, using the at least one processor;

identifying, using the at least one processor, one or more stages within the timing path;

performing, using the at least one processor, a delay calculation (DC) for each of the one or more STA stages;

generating, using the at least one processor, a stage spice deck for each of the one or more STA stages based upon, at least in part, information from the delay calculation; and connecting, using the at least one processor, the stage spice deck for each of the one or more stages in series to form a complete path spice deck;

simulating and debugging the complete path spice deck; and fabricating, based upon, at least in part a debugged complete path spice deck, a debugged electronic circuit design.

16. The computer-implemented method of claim 15 further comprising:

receiving STA information from an STA timing report.

17. The computer-implemented method of claim 16 wherein the STA timing report includes at least one of netlist, pin, cell, arc, delay and slew data.

18. The computer-implemented method of claim 17 wherein an element used in a plurality of stages utilizes a duplicative naming convention.

* * * * *